US 12,487,206 B2

(12) United States Patent
Munakata et al.

(10) Patent No.: US 12,487,206 B2
(45) Date of Patent: Dec. 2, 2025

(54) DEFECT DETECTION DEVICE AND DEFECT DETECTION METHOD

(71) Applicant: Yamaha Robotics Co., Ltd., Tokyo (JP)

(72) Inventors: Hiroshi Munakata, Tokyo (JP); Michael Kirkby, Tokyo (JP); Takuya Adachi, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 267 days.

(21) Appl. No.: 18/273,548

(22) PCT Filed: Jan. 21, 2021

(86) PCT No.: PCT/JP2021/001929
§ 371 (c)(1),
(2) Date: Jul. 21, 2023

(87) PCT Pub. No.: WO2022/157870
PCT Pub. Date: Jul. 28, 2022

(65) Prior Publication Data
US 2024/0426790 A1 Dec. 26, 2024

(51) Int. Cl.
*G01N 29/24* (2006.01)
*G01N 29/04* (2006.01)
*G01N 29/22* (2006.01)

(52) U.S. Cl.
CPC ....... *G01N 29/2418* (2013.01); *G01N 29/041* (2013.01); *G01N 29/223* (2013.01);
(Continued)

(58) Field of Classification Search
None
See application file for complete search history.

(56) References Cited

U.S. PATENT DOCUMENTS 5,146,289 A   9/1992  Newman
9,976,990 B2  5/2018  Ishikawa et al.
(Continued)

FOREIGN PATENT DOCUMENTS

CN   108613979   10/2018
CN   111316093    6/2020
(Continued)

OTHER PUBLICATIONS

"Office Action of Taiwan Counterpart Application", issued on Feb. 2, 2023, with partial English translation thereof, pp. 1-17.
(Continued)

*Primary Examiner* — Suman K Nath
(74) *Attorney, Agent, or Firm* — JCIPRNET

(57) ABSTRACT

A defect detection device (100) that detects defects in a semiconductor device (13) comprises ultrasonic speakers (21) that ultrasonically vibrate the semiconductor device (13), a laser source (30) that irradiates the semiconductor device (13) with collimated laser light (32), a camera (40) that has an imaging element (42) which acquires images by imaging the semiconductor device (13) that has been irradiated with the collimated laser light (32), and a detection unit (55) that detects defects in the semiconductor device (13) on the basis of the images picked up by the camera (40), wherein the detection unit (55) detects defects in the semiconductor device (13) on the basis of the deviation between images acquired by the camera (40) of the semiconductor device (13) when static and when ultrasonically vibrated.

20 Claims, 18 Drawing Sheets

(52) U.S. Cl.
CPC ............... *G01N 2291/0231* (2013.01); *G01N 2291/0289* (2013.01); *G01N 2291/104* (2013.01)

(56) References Cited

U.S. PATENT DOCUMENTS

| | | | |
|---|---|---|---|
| 2019/0306439 A1* | 10/2019 | Morales Delgado | ........................ G03H 1/2294 |
| 2019/0380587 A1* | 12/2019 | Newswanger | ......... G02B 7/002 |
| 2020/0089165 A1* | 3/2020 | Delgado | ............... A61B 5/745 |

FOREIGN PATENT DOCUMENTS

| | | |
|---|---|---|
| DE | 102018221795 | 6/2020 |
| JP | S6085363 | 5/1985 |
| JP | S61254834 | 11/1986 |
| JP | S627200 | 1/1987 |
| JP | H07218449 | 8/1995 |
| JP | 2004101189 | 4/2004 |
| JP | 2007024674 | 2/2007 |
| JP | 2011058879 | 3/2011 |
| JP | 2016130683 | 7/2016 |
| JP | 2016191552 | 11/2016 |
| JP | 2018132481 | 8/2018 |

OTHER PUBLICATIONS

"International Search Report (Form PCT/ISA/210) of PCT/JP2021/001929", mailed on Apr. 20, 2021, with English translation thereof, pp. 1-6.

* cited by examiner

DEFECT DETECTION DEVICE AND DEFECT DETECTION METHOD

CROSS-REFERENCE TO RELATED APPLICATION

This application is a 371 application of the International PCT application serial no. PCT/JP2021/001929, filed on Jan. 21, 2021. The entirety of the above-mentioned patent application is hereby incorporated by reference herein and made a part of this specification.

TECHNICAL FIELD

The invention relates to a configuration of a defect detection device performing defect detection on an inspection target by using ultrasonic waves and a defect detection method performing defect detection by using ultrasonic waves.

RELATED ART

In the manufacture of a semiconductor device, die bonding for bonding a semiconductor die to a substrate or bonding a semiconductor die onto a semiconductor die is performed. In die bonding, a bonding defect may occur on a bonding surface between the substrate and the semiconductor die or a bonding surface between the semiconductor die and the semiconductor die bonded thereupon. Therefore, the bonding state of the bonding surface between the substrate and the semiconductor die or the bonding surface between the semiconductor dies is inspected.

Since such bonding surface cannot be directly observed from the outside, the inspection is performed by using a scan-type acoustic microscope (e.g., see Patent Document 1), for example.

In addition, it is known that if ultrasonic vibration is applied to an inspection target in which a defect is present, the temperature of a portion where a defect, such as a crack, is present is higher than other portions. Based on this principle, a non-destructive inspection device which applies ultrasonic vibration generated from an ultrasonic vibrator to the inspection target, obtains a temperature distribution image of the surface of the inspection target by using infrared thermography, and detects a high temperature portion as a defect is used (see, for example, Patent Document 2).

CITATION LIST

Patent Literature

Patent Document 1: Japanese Patent No. S61-254834
Patent Document 2: Japanese Laid-open No. 2016-191552

SUMMARY OF INVENTION

Technical Problem

However, as the scan-type acoustic microscope recited in Patent Document 1 needs to scan over the inspection target, the scanning device is complicated, and the inspection is time-consuming.

In addition, the conventional inspection device recited in Patent Document 2 performs defect inspection based on a difference in temperature rise of the inspection target due to ultrasonic vibration. Therefore, a defect cannot be detected from the time when ultrasonic waves are applied to the inspection target to the time when the temperature of the inspection target rises to a level necessary for detecting a defect.

Therefore, an objective of the invention is to provide a defect inspection device capable of detecting a defect of a bonding surface of a semiconductor die within a short time by using a simple configuration.

Solution to Problem

A defect detection device according to the invention is a defect detection device detecting a defect of an inspection target. The defect detection device includes: an ultrasonic vibration device, ultrasonically vibrating the inspection target; a coherent light source, irradiating the inspection target with coherent light; a camera, having an imaging element imaging the inspection target irradiated with the coherent light to obtain an image; and a detection unit, detecting the defect of the inspection target based on the image imaged by the camera. The detection unit detects the defect of the inspection target based on a deviation between an image when the inspection target is static and an image when the inspection target is ultrasonically vibrated that are obtained by the camera.

In this way, by irradiating the inspection target with the coherent light and ultrasonically vibrating the inspection target and detecting the defect based on the deviation between the image at the time of being static and the image at the time of ultrasonic vibration, it is not required to perform scanning by using a camera, and defect detection can be carried out within a short time by using a simple configuration.

In the defect detection device according to the invention, it may also be that an exposure time when the camera images is longer than a period of ultrasonic vibration of the inspection target, and the camera obtains an image including an interference pattern that occurs due to interference of the coherent light reflected by a surface of the inspection target, and the detection unit detects the defect of the inspection target based on a deviation between an image including an interference pattern when the inspection target is static and an image including an interference pattern when the inspection target is ultrasonically vibrated that are obtained by the camera.

When the surface of the inspection target is irradiated with the coherent light, the interference pattern due to interference of the coherent light appears on the surface of the imaging element of the camera through reflection. The imaging element of the camera obtains the interference pattern as an image. Since the exposure time of the camera at the time of imaging is longer than the vibration period of the inspection target, when the inspection target vibrates, the camera obtains a shaken image of the interference pattern. When the image of the interference pattern is shaken, the brightness intensity of the pixel changes as compared to the case of being static. When a defect is inherent in the inspection target, such as a defect on the bonding surface of a semiconductor die, the defective portion is vibrated through ultrasonic vibration. Therefore, in the defective portion, the image of the interference pattern is shaken, and the brightness intensity of the pixel changes as compared to the case of being static. Accordingly, the defect of the inspection target can be detected based on the deviation between the image including the interference pattern at the time of being static and the image including the interference pattern at the time of ultrasonic vibration.

In the defect detection device according to the invention, it may also be that the detection unit specifies a vibration occurrence pixel based on the deviation, sets a region in which the vibration occurrence pixel that is specified is densely arranged in a predetermined number or more as a defective region, and detects the defect.

When the image of the interference pattern is shaken by the vibration due to a bonding defect, the brightness intensity of the pixel changes as compared to the case of being static. Therefore, a pixel in which the brightness intensity at the time of vibration changes from the brightness intensity at the time of being static is specified as the vibration occurrence pixel, a region in which the vibration occurrence pixel that is specified is densely arranged in a predetermined number or more as is set s the defective region, and the defect can be detected.

In the defect detection device according to the invention, it may also be that in a case where a predetermined number of other vibration occurrence pixels are present within a predetermined range around the vibration occurrence pixel that is specified, the detection unit maintains specification of the pixel as the vibration occurrence pixel, and in a case where the predetermined number of vibration occurrence pixels are not present within the predetermined range, the detection unit cancels the specification of the pixel as the vibration occurrence pixel.

Accordingly, the specification of the pixel actually not vibrating as the vibration occurrence pixel due to noise is suppressed, and vibration detection can be performed more accurately.

In the defect detection device according to the invention, it may also be that a display displaying an image of the inspection target is included, and the detection unit displays a visualized image in which an expression corresponding to the vibration occurrence pixel that is specified is included in an image of the inspection target on the display.

In this way, the portion where vibration occurs due to a defect inherent in the inspection target can be visualized and displayed.

In the defect detection device according to the invention, it may also be that the coherent light is laser light, and the coherent light source irradiates the inspection target with collimated laser light of a single wavelength.

By irradiating with the collimated light of a single wavelength, the interference of laser light appears more clearly, and the spotted pattern imaged by the camera becomes clearer. Accordingly, vibration detection can be carried out more accurately.

The defect detection device according to the invention may include: a driving unit, supplying high frequency power to the ultrasonic vibration device; and a control unit, adjusting a frequency of the high frequency power supplied from the driving unit to the ultrasonic vibration device. When the detection unit detects the defect of the inspection target, the control unit changes the frequency of the high frequency power supplied from the driving unit to the ultrasonic vibration device.

The frequency at which the defective portion is likely to vibrate changes depending on the size and hardness of the inspection target, the state of the defective portion, etc. Therefore, by changing the frequency of ultrasonic vibration to ultrasonically vibrate the inspection target at various frequencies, the defect detection accuracy can be further facilitated.

The defect detection device according to the invention may include: a current sensor, detecting a current of the high frequency power supplied from the driving unit to the ultrasonic vibration device. When the frequency of the high frequency power supplied from the driving unit to the ultrasonic vibration device is changed, the control unit adjusts a voltage of the high frequency power supplied from the driving unit to the ultrasonic vibration device, so that the current detected by the current sensor falls within a predetermined range.

The ultrasonic vibration device has a frequency at which the ultrasonic vibration device itself resonates. Therefore, when the high frequency power of the resonance frequency is input at the time of ultrasonic vibration, the impedance of the ultrasonic vibration device drops due to resonance, the amplitude of the ultrasonic vibration device increases, and the entire inspection target vibrates significantly. Accordingly, the amplitude of a target part may be hidden in the amplitude of a non-target part and not detectable. Since the amplitude of the ultrasonic vibration device is proportional to the current of the high frequency power input to the ultrasonic vibration device, by detecting the current of the high frequency power input to the ultrasonic vibration device by using a current sensor and adjusting the voltage of the high frequency power so that the detected current falls within a predetermined range, the current of the high frequency power is set within the predetermined range, and the amplitude of the ultrasonic vibrator can be set within a predetermined range. Accordingly, that the entire inspection target vibrates significantly at the time of ultrasonic vibration and the amplitude of the target part is hidden in the amplitude of the non-target part can be suppressed, and the defect of the target part of the inspection target can be detected accurately.

In the defect detection device according to the invention, it may also be that the control unit includes a map in which a change of a voltage of the high frequency power supplied from the driving unit to the ultrasonic vibration device with respect to the frequency of the high frequency power supplied from the driving unit to the ultrasonic vibration device is defined in advance, so that a current of the high frequency power supplied from the driving unit to the ultrasonic vibration device falls within a predetermined range, and when the frequency of the high frequency power supplied from the driving unit to the ultrasonic vibration device is changed, the voltage of the high frequency power supplied from the driving unit to the ultrasonic vibration device is adjusted based on the map.

Accordingly, it is not required to adjust the voltage of the high frequency power by feeding back the current detected by the current sensor. By using a simple configuration, that the entire inspection target vibrates significantly at the time of ultrasonic vibration and the amplitude of the target part is hidden in the amplitude of the non-target part can be suppressed, and the defect of the target part of the inspection target can be detected accurately.

In the defect detection device according to the invention, it may also be that the ultrasonic vibration device is an ultrasonic speaker arranged on a periphery of the inspection target or an ultrasonic vibrator connected with the inspection target and ultrasonically vibrates the inspection target.

Accordingly, a suitable ultrasonic vibration device can be selected based on the size, the type, etc., of the inspection target can be selected to configure the defect detection device.

In the defect detection device according to the invention, it may also be that the ultrasonic vibration device is formed by a plurality of ultrasonic speakers that are directive and disposed on a periphery of the inspection target, the ultrasonic speakers are installed to a casing, so as to concentrate a plurality of ultrasonic waves generated by the respective ultrasonic speakers on the inspection target.

In this way, since the ultrasonic waves from the ultrasonic speakers are concentrated on the inspection target to indirectly ultrasonically vibrate the inspection target and detect the defect, compared with the case where ultrasonic vibration is directly applied to the inspection target, defect detection can be carried out by using a simple configuration. In addition, since the inspection target is ultrasonically vibrated indirectly, the defect of the inspection target can be detected in a non-contact manner.

The defect detection device according to the invention may include: a plurality of driving units, respectively supplying high frequency power to the ultrasonic speakers; and a control unit, adjusting a frequency of the high frequency power supplied from the driving unit to the ultrasonic vibration device. When the detection unit detects the defect of the inspection target, the control unit changes the frequency of the high frequency power supplied from each of the driving units to each of the ultrasonic speakers.

At the time when the inspection target is ultrasonically vibrated by the ultrasonic speakers as well, by changing the frequency of ultrasonic vibration to ultrasonically vibrate the inspection target at various frequencies, the defect detection accuracy can be further facilitated.

The defect detection device according to the invention may include: a current sensor, each detecting a current of the high frequency power supplied from each of the driving units to each of the ultrasonic speakers. When the frequency of the high frequency power supplied from each of the driving units to each of the ultrasonic speakers is changed, the control unit adjusts a voltage of the high frequency power supplied from each of the driving units to each of the ultrasonic speakers, so that the current detected by each of the current sensors falls within a predetermined range.

Accordingly, at the time when the inspection target is ultrasonically vibrated by the ultrasonic speakers as well, the defect of the target part of the inspection target can be accurately detected.

In the defect detection device according to the invention, it may also be that the control unit includes a map in which a change of a voltage of the high frequency power supplied from each of the driving units to each of the ultrasonic speakers with respect to the frequency of the high frequency power supplied from each of the driving units to each of the ultrasonic speakers is defined in advance, so that a current of the high frequency power supplied from each of the driving units to each of the ultrasonic speakers each falls within a predetermined range, and when the frequency of the high frequency power supplied from each of the driving units to each of the ultrasonic speakers is changed, the voltage of the high frequency power supplied from each of the driving units to each of the ultrasonic speakers is adjusted based on the map.

Accordingly, at the time when the inspection target is ultrasonically vibrated by the ultrasonic speakers as well, the defect of the target part of the inspection target can be accurately detected by using a simple configuration.

In the defect detection device according to the invention, it may also be that the control unit respectively adjusts each phase of each of the ultrasonic waves generated by each of the ultrasonic speakers by using each of the driving units.

Accordingly, at the time when the inspection target is ultrasonically vibrated by the ultrasonic speakers, the respective ultrasonic waves are superimposed to increase the ultrasonic vibration in the inspection region, and the inspection target can be ultrasonically vibrated effectively.

A defect detection method according to the invention is a defect detection method for detecting a defect of an inspection target. The defect detection method includes: a static image obtaining step, irradiating the inspection target with coherent light, imaging the inspection target by using a camera, and obtaining an image when the inspection target is static; an ultrasonically vibrated image obtaining step, ultrasonically vibrating the inspection target by using an ultrasonic vibration device while irradiating the inspection target with the coherent light, imaging the inspection target by using the camera, and obtaining an image when the inspection target is ultrasonically vibrated; and a defect detection step, detecting the defect of the inspection target based on a deviation between the image when the inspection target is static and the image when the inspection target is ultrasonically vibrated that are obtained by the camera.

In the defect detection method according to the invention, it may also be that in the static image obtaining step, an image including an interference pattern at a time of being static generated through interference of the coherent light reflected by a surface of the inspection target is obtained by using the camera, in the ultrasonically vibrated image obtaining step, an exposure time of the camera is set longer than a period of ultrasonic vibration of the inspection target, and an image including an interference pattern at a time of ultrasonic vibration generated through interference of the coherent light reflected by the surface of the inspection target is obtained by using the camera, and the detection unit detects the defect of the inspection target based on a deviation between an image including an interference pattern when the inspection target is static and an image including an interference pattern when the inspection target is ultrasonically vibrated that are obtained by the camera.

In the defect detection method according to the invention, it may also be that in the defect detection step, a vibration occurrence pixel is specified based on the deviation, a region in which the vibration occurrence pixel that is specified is densely arranged in a predetermined number or more is set as a defective region, and the defect is detected.

In the defect detection method according to the invention, it may also be that in the defect detection step, in a case where a predetermined number of other vibration occurrence pixels are present within a predetermined range around the vibration occurrence pixel that is specified, specification of the pixel as the vibration occurrence pixel is maintained, and in a case where the predetermined number of vibration occurrence pixels are not present within the predetermined range, the specification of the pixel as the vibration occurrence pixel is canceled.

The defect detection method according to the invention may include a display step, displaying a visualized image in which an expression corresponding to the vibration occurrence pixel that is specified is included in an image of the inspection target on a display.

A vibration detection device according to the invention is a vibration detection device detecting vibration of an inspection target. The vibration detection device includes: an ultrasonic vibration device, ultrasonically vibrating the inspection target; a coherent light source, irradiating the inspection target with coherent light; a camera, having an imaging element imaging the inspection target irradiated with the coherent light to obtain an image; and a detection unit, processing the image obtained by the camera and specifying a vibration occurrence location. An exposure time when the camera images is longer than a period of ultrasonic vibration of the inspection target, and the camera obtains an image including an interference pattern that occurs due to interference of the coherent light reflected by a surface of the inspection target, and the detection unit specifies the vibration occurrence location of the inspection target based on a deviation between an image including an interference pattern when the inspection target is static and an image including an interference pattern when the inspection target is ultrasonically vibrated that are obtained by the camera.

The vibration detection device according to the invention may include a display displaying an image of the inspection target is included. The detection unit specifies a vibration occurrence pixel indicating the vibration occurrence location based on the deviation, and displays a visualized image in which an expression corresponding to the vibration occurrence pixel that is specified is comprised in an image of the inspection target on the display.

Effects of Invention

The invention is capable of providing a defect detection device capable of detecting a defect of the bonding surface of a semiconductor die within a short time by using a simple configuration.

DESCRIPTION OF EMBODIMENTS

<Configuration of Defect Detection Device>

Figure 1:
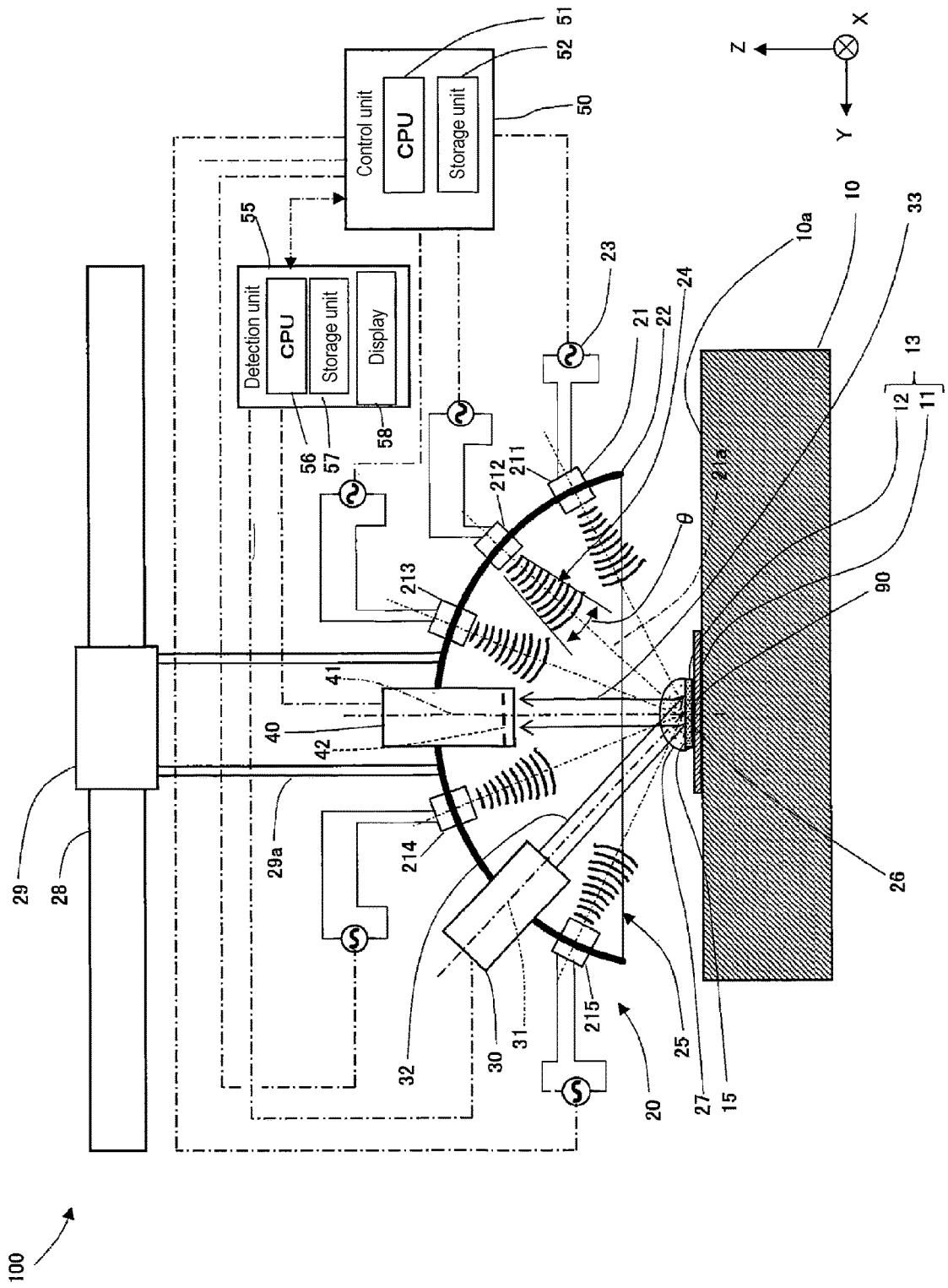
FIG. 1 is an elevation view illustrating a configuration of a defect detection device according to an embodiment.

In the following, a defect detection device 100 of the embodiment is described with reference to the drawings. As shown in FIG. 1, the defect detection device 100 includes a stage 10, an acoustic head 20, a laser light source 30, a camera 40, a control unit 50, and a detection unit 55. A direction perpendicular to the paper surface of FIG. 1 is set as X-direction, a direction orthogonal to X-direction on a horizontal plane is set as Y-direction, and an upper-lower direction is set as Z-direction. FIG. 1 shows five ultrasonic speakers 21 installed to a casing 22 of the acoustic head 20. In the case where the respective ultrasonic speakers 21 are not distinguished from each other, the ultrasonic speakers are referred to as ultrasonic speakers 21, and in the case where the respective ultrasonic speakers 21 are distinguished from each other, the ultrasonic speakers are referred to as ultrasonic speakers 211 to 215.

The stage 10 is installed to a base not shown herein. The stage 10 sucks and holds a semiconductor device 13 that is an inspection target on a holding surface 10a on the upper side. The semiconductor device 13, for example, may be formed by a substrate 11 and a semiconductor die 12 installed onto the substrate 11 by using an adhesive, may be a device in which the semiconductor die 12 is mounted, by flip-chip bonding, onto the substrate 11, and may also be a device in which multiple semiconductor dies 12 are laminated onto the substrate 11 through direct bonding.

In the example shown in FIG. 1, the semiconductor device 13 is formed by bonding the semiconductor die 12 onto the substrate 11 by using an adhesive. Therefore, a gap 90 (see FIG. 4) due to a bonding defect intervenes between the upper surface of the substrate 11 and the lower surface of the semiconductor die 12. In the following description, a portion on the gap 90 of the semiconductor die 12 is referred to as a defective part 14.

The acoustic head 20 is disposed to be spaced apart from the stage 10 above the side of the holding surface 10a of the stage 10. The acoustic head 20 is formed by the casing 22 and the ultrasonic speakers 21 installed to the casing 22. The casing 22 of the acoustic head 20 is suspended by a rod 29a from a slider 29 movable in Y-direction and installed to a guide rail 28 provided on the stage 10.

The casing 22 of the acoustic head 20 is spherical, dome-shaped and open to the lower stage side 25. A spherical center 26 of a spherical surface formed by the casing 22 is located on a surface 15 of the semiconductor device 13 held on the holding surface 10a of the stage 10. The ultrasonic speaker 21 is a directive ultrasonic wave generator, and generates an ultrasonic wave 24 so that the ultrasonic wave 24 propagates within a range of a directive angle θ with an axis 21a as the center in the direction of the axis 21a. A frequency f of the ultrasonic wave 24 ranges from tens of kHz to hundreds of kHz. The ultrasonic speakers 21 are installed to the casing 22, so that the respective axes 21a intersect with each other at the spherical center 26 of the spherical surface of the casing 22. Therefore, the ultrasonic waves 24 respectively generated from the ultrasonic speakers 21 are concentrated on the surface 15 of the semiconductor device 13 held on the holding surface 10a and located at the spherical center 26. A region where the ultrasonic waves 24 are concentrated is a detection region 27 for performing defect detection. As shown in FIG. 1, the size of the detection region 27 is greater than the size of the semiconductor die 12, and the semiconductor die 12 and the substrate 11 are ultrasonically vibrated. The ultrasonic speakers 21 form an ultrasonic vibration device.

A driving unit 23 driving each of the ultrasonic speakers 21 is connected to each of the ultrasonic speakers 21. Each driving unit 23 supplies high frequency power to each of the ultrasonic speakers 211 to 215 to drive each of the ultrasonic speakers 211 to 215. In addition, each driving unit 23 is able to adjust each phase of each ultrasonic wave 24 generated by each of the ultrasonic speakers 211 to 215 that is connected to each driving unit 23.

The driving unit 23 driving each of the ultrasonic speakers 21 is connected to the control unit 50 to perform driving in accordance with a command of the control unit 50. The control unit 50 is a computer including a CPU 51 that is a processor internally performing information processing and a storage unit 52 storing a control program and control data.

The laser light source 30 converts laser light of a single wavelength that is output from a laser oscillator into collimated laser light 32 by using a beam expander, and irradiates the semiconductor device 13 with the collimated laser light 32 of a single wavelength. In the example shown in FIG. 1, the laser light source 30 is installed to the casing 22 of the acoustic head 20, so that an optical axis 31 is inclined with respect to the stage 10 to pass through the spherical center 26. That is, the laser light source 30 is installed to the casing 22, so as to irradiate the detection region 27 of the surface 15 of the semiconductor device 13 with the collimated laser light 32 from an obliquely upper part. The collimated laser light 32 is coherent light with high coherence, and the laser light source 30 is a coherent light source that emits coherent light. The laser light source 30 may also omit the beam expander.

The camera 40 includes an imaging element 42 formed by multiple pixels 46 (see FIG. 7), and images a two-dimensional image of the semiconductor device 13 irradiated with the collimated laser light 32. In the embodiment shown in FIG. 1, the camera 40 is installed to the casing 22, so that an optical axis 41 passes through the spherical center 26 vertically with respect to the stage 10. Accordingly, in the embodiment shown in FIG. 1, the camera 40 is installed to the casing 22, so as to image the detection region 27 of the surface 15 of the semiconductor device 13 from the right above.

The camera 40 may also be obliquely inclined to be installed to the casing 22, without being right above the detection region 27, if the camera 40 is at a position able to capture an image of the semiconductor device 13 irradiated with the collimated laser light 32 from the laser light source 30. In addition, the camera 40 may capture a motion image or a static image.

The laser light source 30 and the camera 40 are connected to the detection unit 55. The detection unit 55 processes the two-dimensional image imaged by the camera 40, and detects the defective region 91 (see FIG. 8). The detection unit 55 is a computer including a CPU 56 that is a processor internally performing information processing, a storage unit 57, storing a control program and control data, and a display 58 displaying a visualized image 12e (see FIG. 10). In addition, the detection unit 55 is connected with the control unit 50 and transmits and receives data.

<Principle of Defect Detection Operation Using Defect Detection Device>

In the following, the principle of a defect detection operation of the defect detection device 10 is described with reference to FIGS. 2 to 8.

Figure 2:
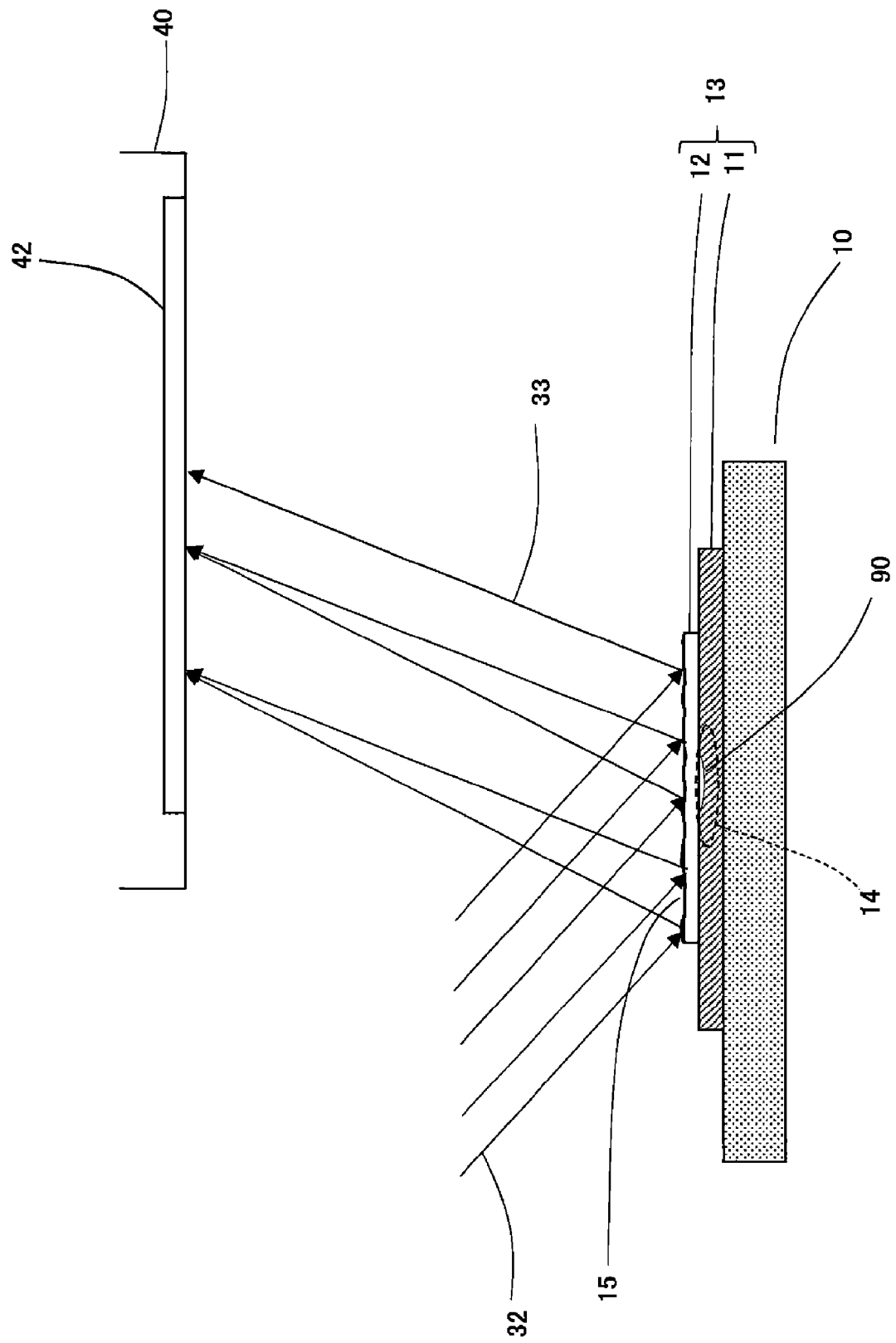
FIG. 2 is a schematic view illustrating a state in which collimated laser light reflected by a surface of a semiconductor die enters an imaging element of a camera when a semiconductor device is static and not ultrasonically vibrated.

As shown in FIG. 2, the surface 15 of the semiconductor die 12 bonded onto the substrate 11 has fine unevenness. Therefore, when the surface 15 of the semiconductor die 12 is irradiated with collimated laser light 32 in a static state in which the semiconductor device 13 is not ultrasonically vibrated, the collimated laser light 32 is reflected in random directions by the surface 15 of the semiconductor die 12. Reflected laser light 33 reflected in random directions interferes with each other, and an interference pattern of the reflected laser light 33 appears on the surface of the imaging element 42 of the camera 40.

The interference pattern has a bright portion where light is strengthened and a dark portion where light is weakened. Therefore, as shown in FIG. 3, the imaging element 42 of the camera 40 obtains the interference pattern as an image 12a that is a spotted pattern formed by multiple bright parts 16 and dark parts 17 present on the surface of the image of the semiconductor die 12.

Figure 3:
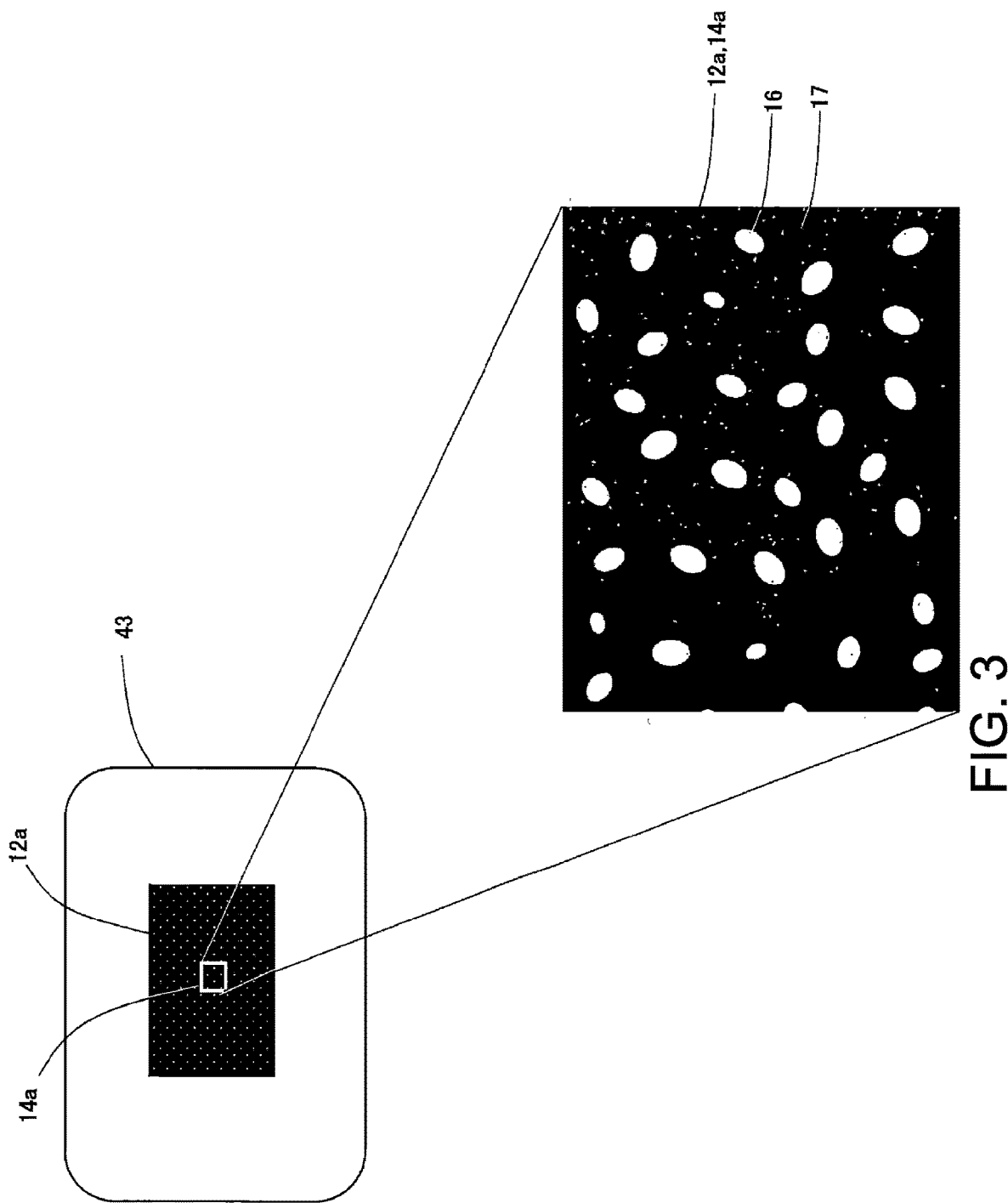
FIG. 3 is a schematic view illustrating an image imaged by the camera in the state of FIG. 2.

Accordingly, when the camera 40 images the semiconductor die 12, the camera 40 obtains the image 12a of the semiconductor die 12 of a spotted pattern, as shown in a visual field 43 of FIG. 3. The image 12a is an image including the interference pattern when the semiconductor die 12 is static. In addition, the defective part 14 is not ultrasonically vibrated at the time when the semiconductor die 12 is static. Therefore, the camera 40 obtains an image of the interference pattern same as other portions as an image 14a of the interference pattern of the defective part 14.

Figure 4:
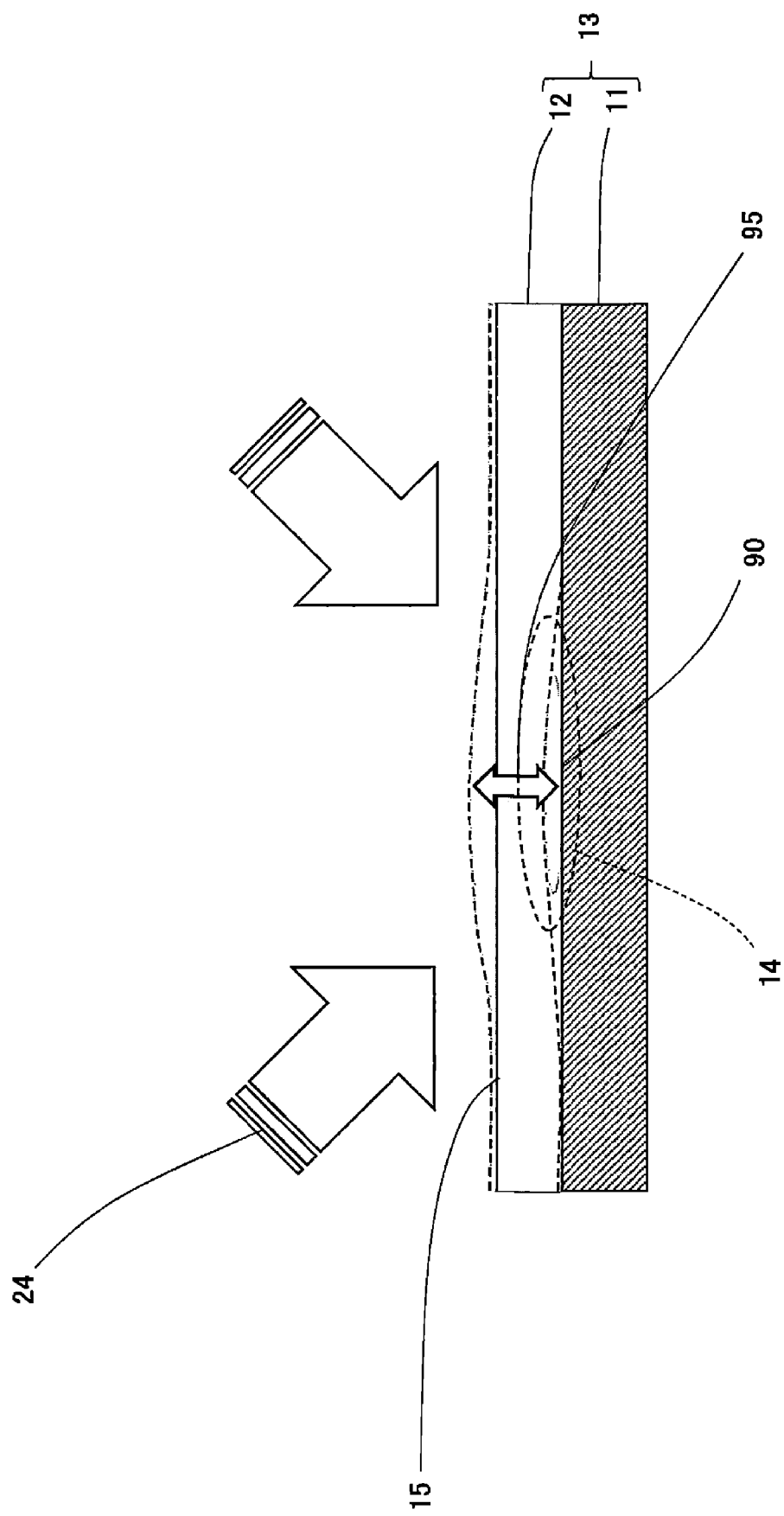
FIG. 4 is a schematic view illustrating vibration of a defective bonding part when the semiconductor device is ultrasonically vibrated.

Then, as shown in FIG. 4, each of the ultrasonic speakers 21 is driven by each of the driving units 23 to generate the ultrasonic wave 24 of the predetermined frequency f from each of the ultrasonic speakers 21. The ultrasonic waves 24 generated from the respective ultrasonic speakers 21 intersect with each other and are concentrated and superimposed with each other in the detection region 27 in the vicinity of the spherical center 26 of the casing 22, and ultrasonically vibrate the semiconductor device 13 formed by the substrate 11 and the semiconductor die 12.

The defective part 14 in which the gap 90, which is a defect between the substrate 11 and the semiconductor die 12, is present vibrates significantly with respect to the substrate 11, as indicated by an arrow 95 in FIG. 4. Meanwhile, portions that are other than the defective part 14 and favorably bonded to the substrate 11 of the semiconductor 12 hardly vibrate with respect to the substrate 11.

Figure 5:
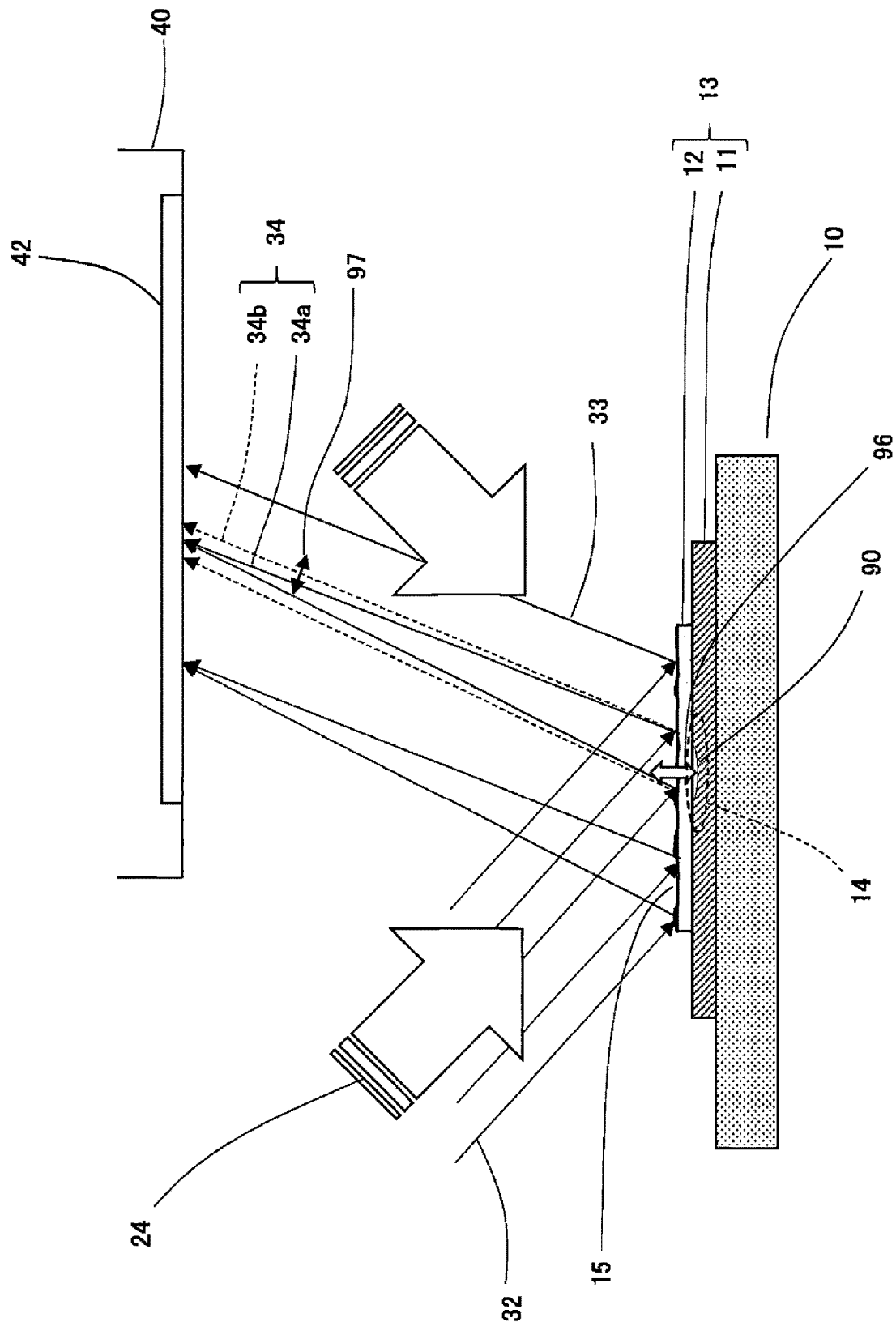
FIG. 5 is a schematic view illustrating a state in which the vibration of the collimated laser light reflected by the surface of the semiconductor die and the reflected laser light enter the imaging element of the camera when the semiconductor device is ultrasonically vibrated and the defective bonding part vibrates.

When the defective part 14 of the semiconductor die 12 is vibrated through ultrasonic vibration, the surface 15 of the semiconductor die 12 vibrates as indicated by an arrow 96 shown in FIG. 5. Accordingly, the light path of the reflected laser light 33 reflected by the surface 15 of the defective part 14 of the semiconductor die 12 is shaken, as indicated by an arrow 97, between a light path 34a and a light path 34b shown in FIG. 5. The shaking of a light path 34 including the light paths 34a and 34b occurs at a vibration period same as the ultrasonic vibration of the semiconductor die 12.

Figure 6:
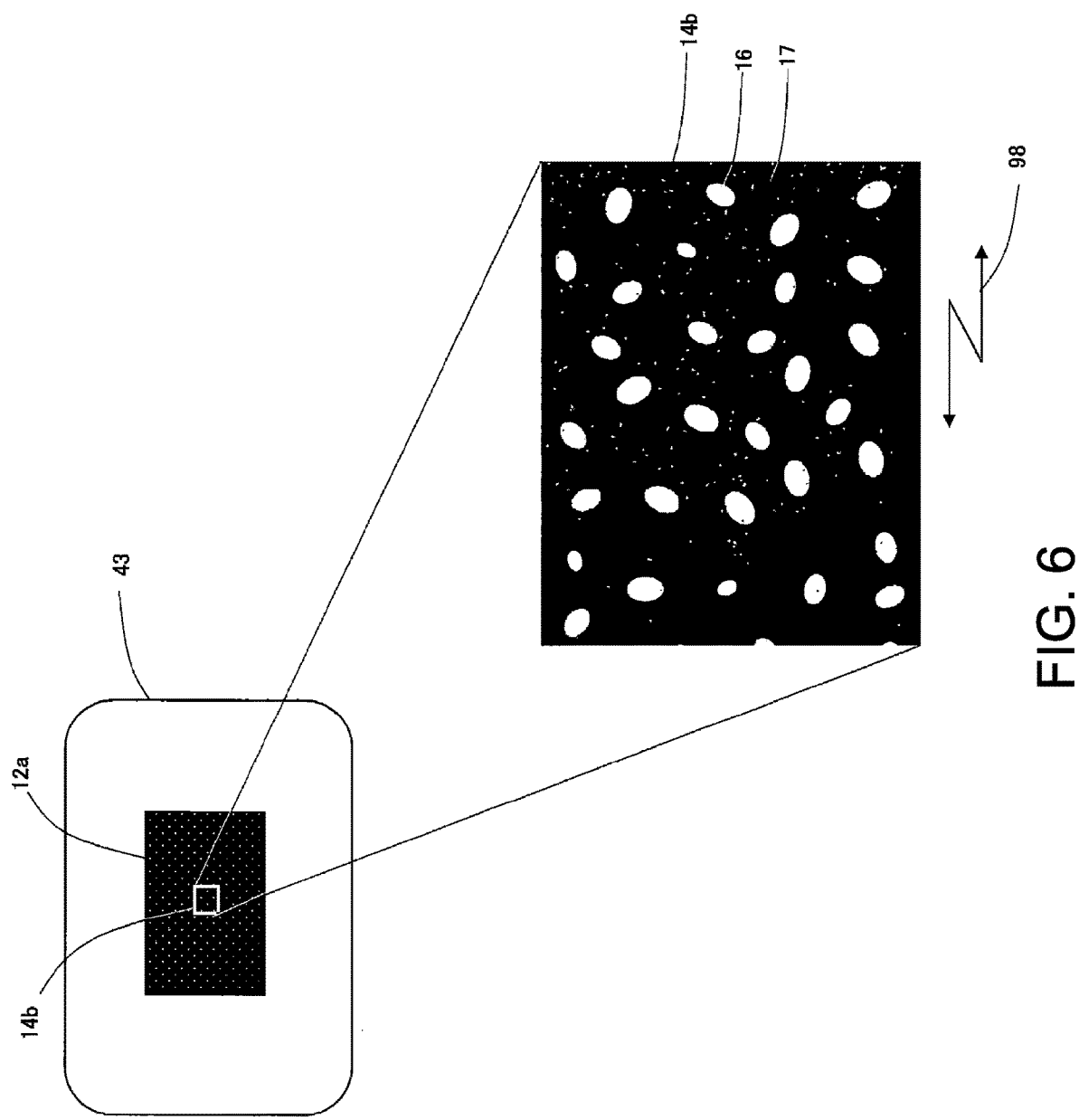
FIG. 6 is a schematic view illustrating an image imaged by the camera in the state of FIG. 5.

With the shaking of the light paths 34a and 34b, the image 14a of the defective part 14 of the semiconductor die 12 with the spotted pattern on the imaging element 42 described with reference to FIG. 3, becomes an image 14b shaken as indicated by an arrow 98 shown in FIG. 6. Here, if the image of the semiconductor die 12 is captured with an exposure time of the camera 40 longer than the vibration period of the ultrasonic vibration of the semiconductor die 12, the camera 40 obtains the image 14b with the shaken spotted pattern as shown in FIG. 6 as the image of the interference pattern of the defective part 14.

Meanwhile, portions other than the defective part 14 of the semiconductor die 12 and favorably bonded to the semiconductor die 12 of the substrate 11 are hardly vibrated with respect to the substrate 11. Therefore, the image 12a of the portions other than the defective part 14 of the semiconductor die 12 with the spotted pattern on the imaging element 42 is not shaken. Therefore, the camera 40 obtains the image 12a of the spotted pattern that is not shaken as described with reference to FIG. 3 as the image of the interference pattern of the portions other than the defective part 14.

In the defective part 14 where the image 14b of the interference pattern is shaken during exposure, the brightness intensity of the pixels 46 of the imaging element 42 changes as compared to the brightness intensity of the image 14a of the interference pattern in the static state without ultrasonic vibration or a non-vibrating state. As an example, the brightness intensity of the pixels 46 in the defective part 14 in which the image 14b of the interference pattern is shaken is greater than that of the image 14a of the interference pattern at the time of non-vibration.

Meanwhile, in the portions other than the defective part, in which the image 12a of the interference pattern is not shaken during exposure even with ultrasonic vibration, the image 12a of the interference pattern is not shaken like the image 12a of the interference pattern when the semiconductor die 12 is in the static state or the non-vibrating state. Therefore, in the portions other than the defective part 14, the brightness intensity of the pixels 46 of the imaging element 42 is substantially the same as the brightness intensity in the static state where the semiconductor die 12 is not ultrasonically vibrated or in the non-vibrating state.

Figure 7:
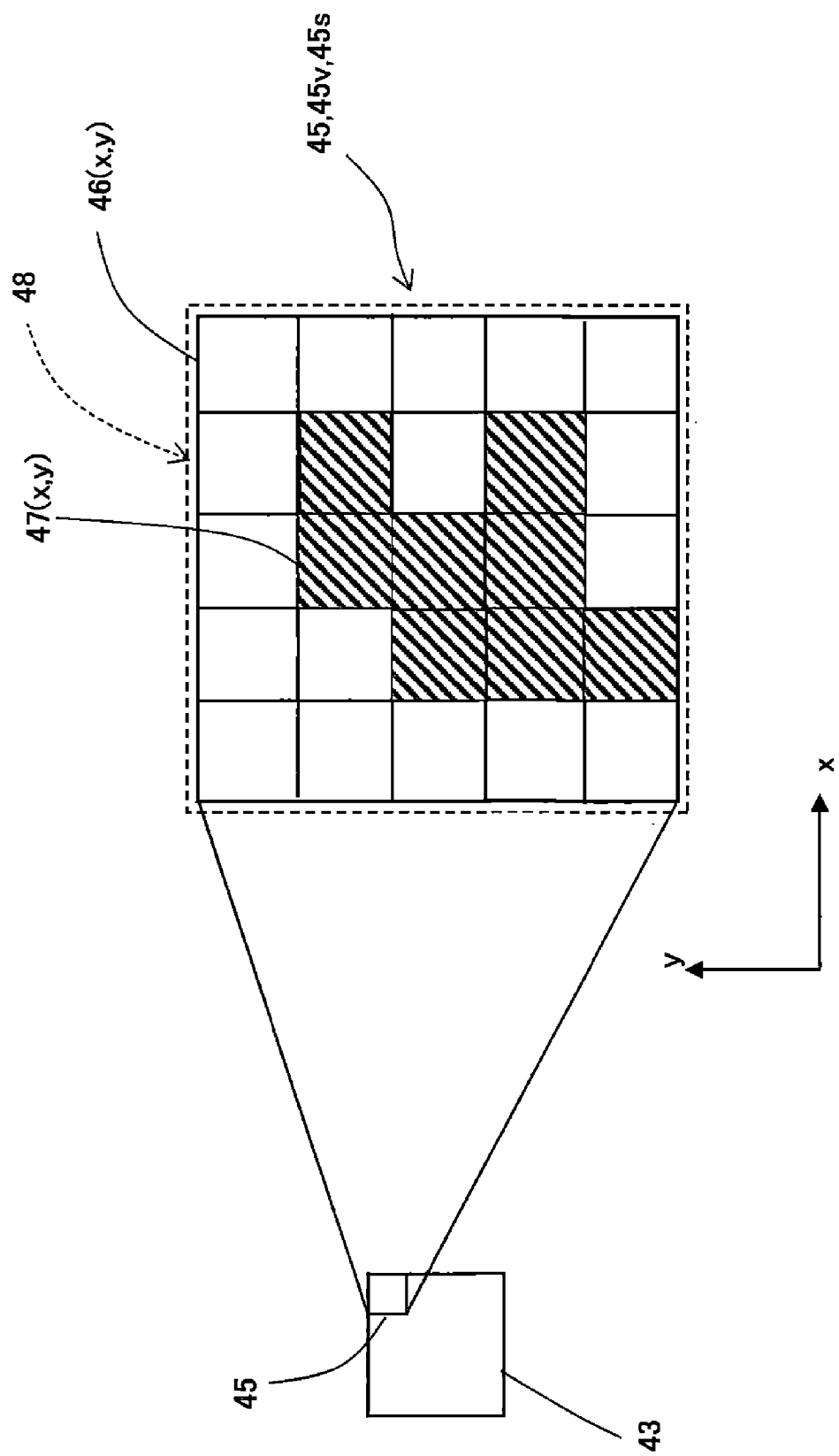
FIG. 7 is a schematic view illustrating a pixel of the imaging element of the camera.
Figure 8:
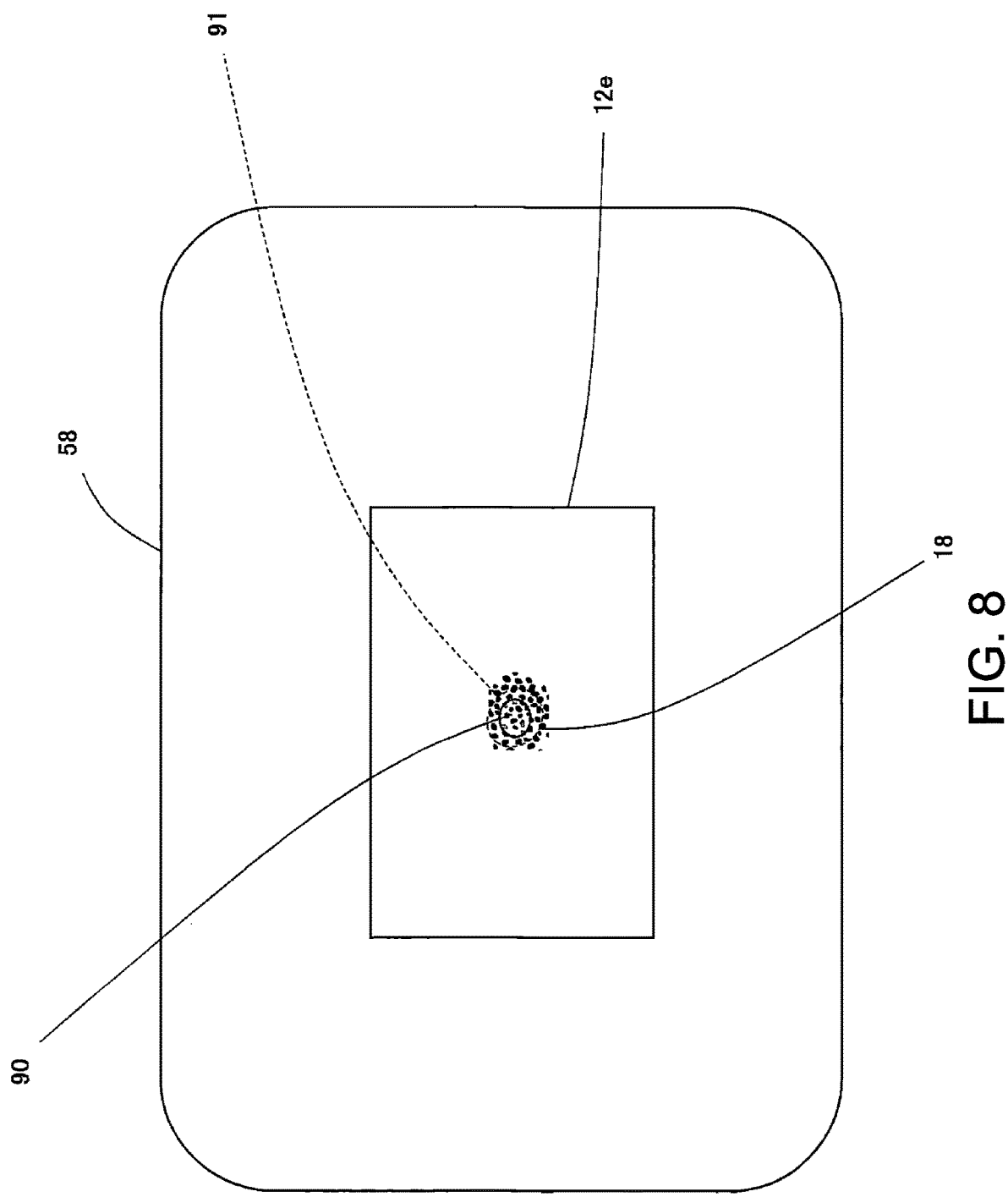
FIG. 8 is a schematic view illustrating a visualized image displayed on a display.

The detection unit 55, as shown in FIG. 7, specifies a pixel 46 in which the brightness intensity during ultrasonic vibration changes from the brightness intensity at the time of being static without ultrasonic vibration or at the time of non-vibration as a vibration occurrence pixel 47, and detects a region including the specified vibration occurrence pixel 47 as the defective region 91 as shown in FIG. 8.

In addition, as shown in FIG. 8, the detection unit 55 displays the visualized image 12e on the display 58. In the visualized image 12e, an expression 18 corresponding to the vibration occurrence pixel 47 that is specified is included in the image of the semiconductor die 12. Accordingly, whether the defective part 14 is present can be determined from the display of the display 58.

<Details of Defect Detection Operation Using Defect Detection Device>
<1. Static Image Obtaining Step and Ultrasonically Vibrated Image Obtaining Step>

In the following, the details of the operation of the defect detection device 100 of the embodiment is described with reference to FIGS. 9 and 10.

Figure 9:
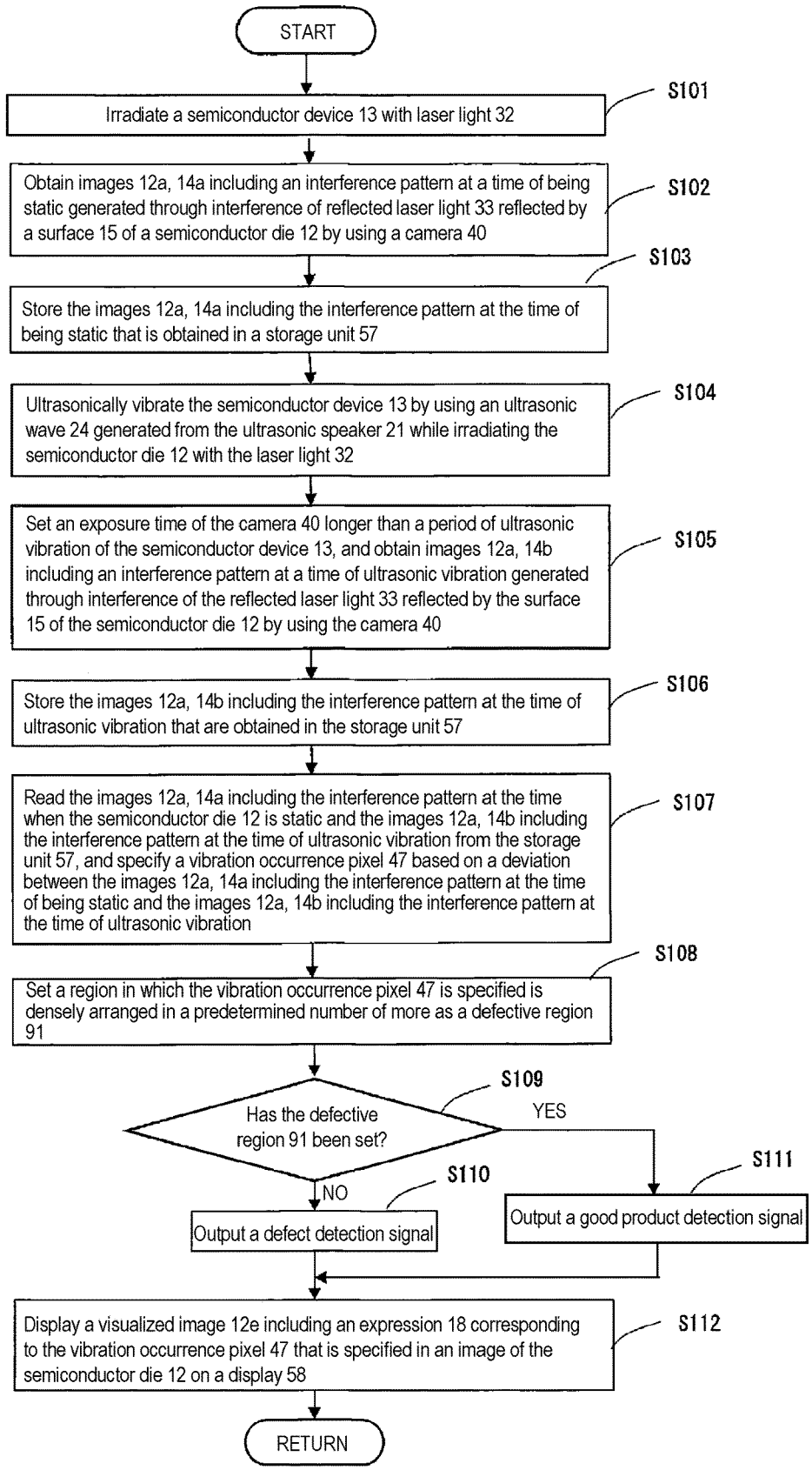
FIG. 9 is a flowchart illustrating an operation of the defect detection device shown in FIG. 1.

As shown in Step S101 of FIG. 9, the CPU 56 of the detection unit 55 outputs an irradiation command of the collimated laser light 32 to the laser light source 30. According to the command, the laser light source 30 irradiates the collimated laser light 32 toward the semiconductor die 12 of the semiconductor device 13.

When the irradiation of the collimated laser light 32 starts, the CPU 56 of the detection unit 55 proceeds to Step S102 of FIG. 9 and, as shown in FIGS. 2 and 3, obtains the images 12a, 14a including the interference pattern generated through the interference of the reflected laser light 33 reflected by the surface 15 of the semiconductor die 12 by using the camera 40 (static image obtaining step).

The CPU 56 proceeds to Step S103 of Step 9, and stores the images 12a, 14a including the obtained interference pattern in the storage unit 57.

The CPU 56 of the detection unit 55 proceeds to Step S104 of FIG. 9, and outputs a signal for starting driving the ultrasonic speaker 21 to the control unit 50. When the signal is input, the CPU 51 of the control unit 50 outputs the command for starting driving the ultrasonic speaker 21 to each driving unit 23. In accordance with the command, each driving unit 23 drives the ultrasonic speaker 21 and generates the ultrasonic wave 24 of the predetermined frequency f from each ultrasonic speaker 21. Each ultrasonic speaker 21 is directive, and propagates within a range of the directive angle θ with the axis 21a as the center in the direction of each axis 21a. Since the respective ultrasonic speakers 21 are installed to the casing 22 so that the respective axes 21a intersect with each other at the spherical center 26 of the casing 22, the ultrasonic waves 24 generated from the respective ultrasonic speakers 21 intersect with each other, and are concentrated and superimposed with each other in the vicinity of the spherical center 26 of the casing 22.

The CPU 51 of the control unit 50 adjusts the respective phases of the respective ultrasonic speakers 21 by using the respective driving units 23, so that the amplitude of the ultrasonic vibration in the vicinity of the spherical center 26 increases through superimposing of the ultrasonic waves 24. As an example, the phases of the ultrasonic waves 24 generated by the ultrasonic speakers 211, 215 located at symmetric positions with respect to the spherical center 26 are shifted by 180 degrees. In addition, as another example, the CPU 51 may make adjustment so that the phases of the respective ultrasonic waves 24 generated by the respective ultrasonic speakers 211 to 215 are dispersed by using the driving units 23. Accordingly, the amplitude of the ultrasonic vibration of the detection region 27 which is the range in which the ultrasonic waves 24 in the vicinity of the spherical center 26 are concentrated can be increased.

In this way, the CPU 51 of the control unit 50 generates the ultrasonic waves 24 from the ultrasonic speakers 21 by using the driving units 23 and ultrasonically vibrates the semiconductor device 13 formed by the substrate 11 and the semiconductor die 12.

When the semiconductor device 13 is ultrasonically vibrated, in the defective part 14 in which the gap 90, which is a defect between the substrate 11 and the semiconductor die 12, is present, the semiconductor die 12 vibrates significantly with respect to the substrate 11, as indicated by the arrow 95 in FIG. 4.

When the ultrasonic vibration is started by using the ultrasonic speakers 21, the CPU 51 of the control unit 50 outputs a signal indicating ultrasonic vibration is being carried out and the frequency f of ultrasonic vibration to the detection unit 55. When the signal is input, at Step S105 of FIG. 9, the CPU 56 of the detection unit 55 sets the exposure time of the camera 40 to be longer than the period of ultrasonic vibration, and obtains the images 12a, 14a including the interference pattern at the time of ultrasonic vibration by using the camera 40 as described with reference to FIG. 6.

If the image of the semiconductor die 12 is captured with the exposure time of the camera 40 longer than the vibration period of the ultrasonic vibration of the semiconductor die 12, the camera 40 obtains the image 14b with the shaken spotted pattern as shown in FIG. 6 as the image of the interference pattern of the defective part 14. In addition, the image 12a of the spotted pattern that is not shaken as described with reference to FIG. 3 is obtained as the image of the interference pattern of the portions other than the defective part 14 (ultrasonically vibrated image obtaining step).

When obtaining the images 12a, 14b including the interference pattern by using the camera 40, the CPU 56 of the detection unit 55 proceeds to Step S106 of FIG. 9 and stores the images 12a, 14b in the storage unit 57.

<2. Defect Detection Step>
<a. Specification of Vibration Occurrence Pixel>

Figure 10:
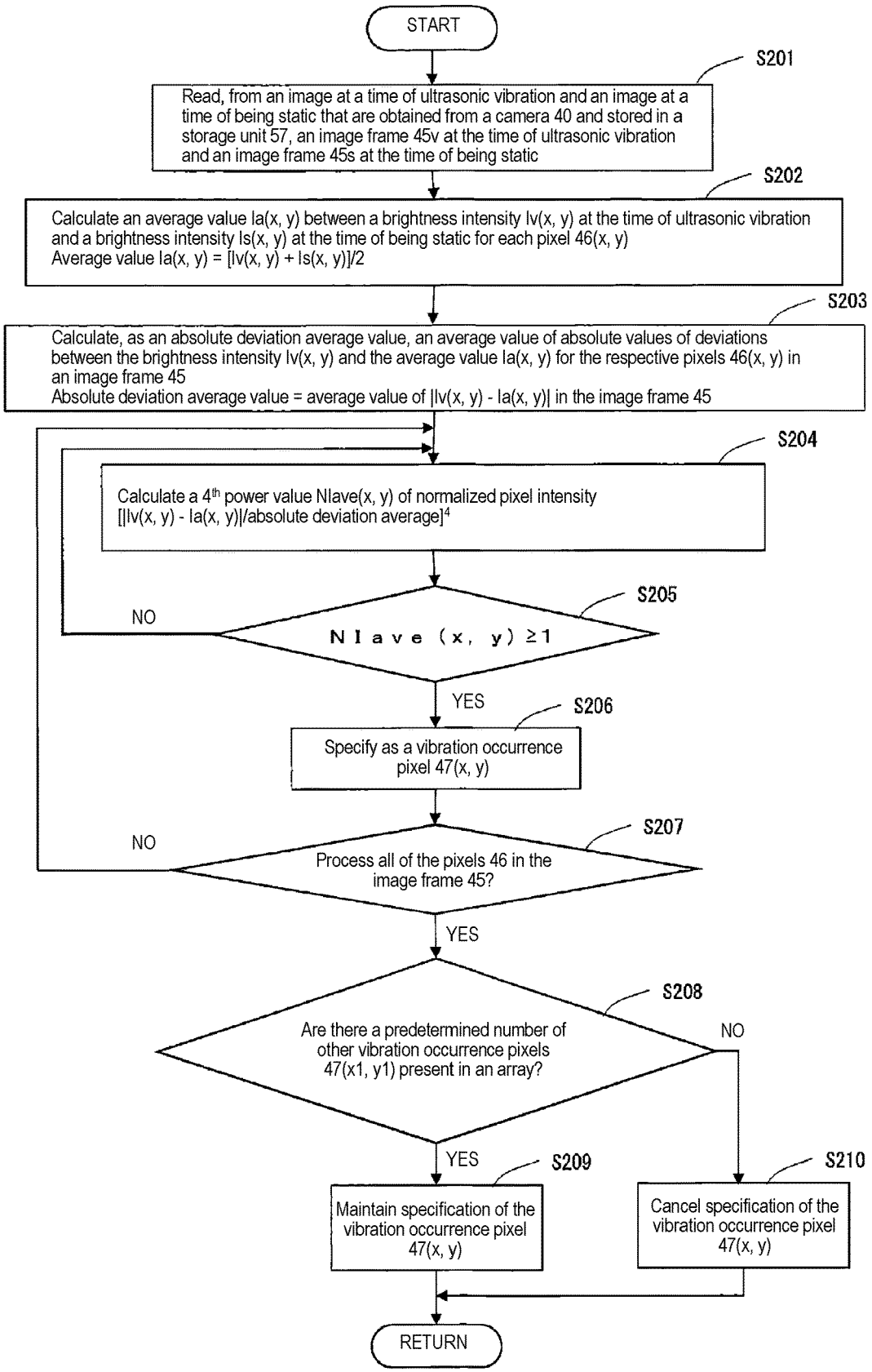
FIG. 10 is a flowchart illustrating an operation of the defect detection device shown in FIG. 1 for specifying a vibration occurrence pixel.

In Step S107 of FIG. 9, the CPU 56 of the detection unit 55 reads the images 12a, 14a including the interference pattern when the semiconductor die 12 is static and the images 12a, 14b including the interference pattern when the semiconductor die 12 is ultrasonically vibrated from the storage unit 57, and executes Step S201 to S210 [1] of FIG. 10 to specify the vibration occurrence pixel 47 based on the deviation between the images 12a, 14a including the interference pattern at the time of being static and the images 12a, 14b including the interference pattern at the time of ultrasonic vibration.

In the following, details of the operation for specifying the vibration occurrence pixel 47 are described with reference to FIGS. 7 and 10. The CPU 56 of the detection unit 55 specifies a pixel 46 in which the brightness intensity during ultrasonic vibration changes from the brightness intensity at the time of being static without ultrasonic vibration or at the time of non-vibration as the vibration occurrence pixel 47.

As shown in FIG. 7, the CPU 56 of the detection unit 55 performs a process as described below for each pixel 46 of an image frame 45 which is a region of a two-dimensional image of the visual field 43 on which an image process is performed once, and specifies the vibration occurrence pixel 47. In the following description, the coordinates (x, y) following a reference symbol indicate the coordinates (x, y) of the two-dimensional image frame 45. For example, the pixel 46 (x, y) indicates the pixel 46 whose coordinates are (x, y).

As shown in Step S201 of FIG. 10, the CPU 56 of the detection unit 55 reads an image frame 45v at the time of ultrasonic vibration and an image frame 45s at the time of being static from the two-dimensional image at the time of ultrasonic vibration and the two-dimensional image at the time of being static or non-vibration that are obtained from the camera 40 and stored in the storage unit 57.

As shown in Step S202 of FIG. 10, the CPU 56 calculates an average value Ia (x, y) between a brightness intensity Iv (x, y) at the time of ultrasonic vibration and a brightness intensity Is (x, y) at the time of being static for each pixel 46 (x, y).

Average value $Ia(x,y)=[Iv(x,y)+Is(x,y)]/2$

As shown in Step S203 of FIG. 10, the CPU 56 calculates, as an absolute deviation average value, an average value of the absolute values of the deviations between the brightness intensities Iv (x, y) at the time of ultrasonic vibration and the average value Ia (x, y) for the respective pixels 46 (x, y) in the image frame 45.

Absolute deviation average value=Average value of $|Iv(x,y)-Ia(x,y)|$ in the image frame 45

As shown in Step S204 of FIG. 10, the CPU 56 calculates a value NIave (x, y) of $4^{th}$ power of the normalized pixel intensity according to (Formula 1) below.

$$NIave(x,y)=[|Iv(x,y)-Ia(x,y)|/\text{absolute deviation average value}]^4 \quad \text{(Formula 1)}$$

As shown in Step S205 of FIG. 10, in the case where NIave (x, y) is 1 or more, the CPU 56 determines that the change of the brightness intensity of the pixel 46 (x, y) is significant, proceeds to Step S206 of FIG. 10 to specify the pixel 46 (x, y) as the vibration occurrence pixel 47 (x, y), and proceeds to Step S207. In Step S207, in the case of determining that not all of the pixels 46 (x, y) in the image frame 45 are processed, the CPU 56 returns to Step S204 and process the next pixel 46 (x, y). Meanwhile, in the case where NO is determined in Step S205 of FIG. 10, the CPU 56 returns to Step S204 and process the next pixel 46 (x, y). After NIave (x, y) of all the pixels 46 (x, y) in the image frame 45 are calculated, and the vibration occurrence pixel 47 (x, y) is determined in the image frame 45, the CPU 56 determines YES in Step S207 and proceeds to Step 208 of FIG. 10.

In Step S208 of FIG. 10, the CPU 56 confirms whether a predetermined number of other vibration occurrence pixels 47 (x1, y1) are present within a predetermined range around one vibration occurrence pixel 47 (x, y). For example, it may also be that, as the predetermined range, a square-shaped array 48 of 5×5 pixels 46 with the vibration occurrence pixel 47 (x, y) as the center is set, and whether 7 to 8 other vibration occurrence pixels 47 (x1, y1) are present in the array 48 is determined. In addition, in the case where YES is determined in Step S208 of FIG. 10, the change of the brightness intensity of the pixel 46 (x, y) is determined as due to ultrasonic vibration, and the CPU 56 proceeds to Step S209 of FIG. 10 to maintain the specification of the pixel 46 (x, y) as the vibration occurrence pixel 47 (x, y).

Meanwhile, in the case where there are no 7 to 8 other vibration generation pixels 47 (x1, y1) in the array 48, the CPU 56 determines that the change of the brightness intensity of the pixel 46 (x, y) is not due to ultrasonic vibration, and the process proceeds to Step S210 to cancel the specification of the pixel 46 (x, y) as the vibration occurrence pixel 47 (x, y).

In addition, the CPU 56 confirms the specification of the vibration occurrence pixel 47 (x, y). The CPU 56 performs the above process on each image frame 45, and confirms the specification of the vibration occurrence pixel 47 (x, y) for all the pixels 46 (x, y) of the imaging element 42.

<b. Defect Detection>

If the CPU 56 executes Step S107 of FIG. 9 and Steps S201 to S210 of FIG. 10 to specify the vibration occurrence pixel 47, the CPU 56 of the detection unit 55 proceeds to Step S108 of FIG. 9, and sets, as the defective region 91, a region in which the vibration occurrence pixel 47 specified in Step S107 of FIG. 9 is densely arranged in a predetermined number or more in the imaging element 42.

Various processes are available as the process for setting the defective region 91. For example, it may also be that the array 48 is set as a vibration occurrence array in the case where the number of vibration occurrence pixels 47 in the square-shaped array 48 of 5×5 pixels 46 described with reference to FIG. 7 is equal to or greater than a predetermined value, and a region with consecutive vibration occurrence arrays are set as the defective region 91. At this time, the predetermined value may be determined through testing, etc. For example, the predetermined value may be set as a half of the number of the pixels 46 included in the array 48, or the predetermined value may be set between 30% to 70%. In addition, the pixels 46 included in the array 48 may be in the number of 5×5=25 as described above, and may also be in the number of 100×100=10000.

In addition, it may also be that a region in which a consecutive length or area of the vibration occurrence arrays is equal to or greater than a predetermined threshold is set as the defective region 91, and in the case where the consecutive length or area of the vibration occurrence arrays is less than the predetermined threshold, the region is not set as the defective region 91. The predetermined threshold may be set in accordance with a comparative test, etc., between a good product and an inferior product. For example, the predetermined threshold may also be set as a length obtained by increasing a consecutive length of the vibration occurrence arrays present in a good product. For example, in the case of a semiconductor die 12 as a good product has consecutive vibration occurrence arrays of about 0.05 mm, the predetermined threshold may be set, for example, from 0.08 mm to 0.1 mm.

Also, the predetermined threshold may also change in accordance with the region in which the vibration occurrence arrays are consecutive. For example, in the semiconductor device 13 to which multiple semiconductor dies 12 are directly bonded, the predetermined threshold in the peripheries of the electrodes of the upper/lower semiconductor dies 12 may be set to be smaller than other portions to strictly check the bonding between electrodes. Also, the predetermined threshold may also be set to be small in the periphery of the semiconductor die 12 and set to be large at the center. On the contrary, it may also be that the predetermined threshold is set to be large in the periphery of the semiconductor die 12 and set to be small at the center.

Although an example of setting the defective region 91 is described above, the invention is not limited to the above method, as long as a region in which the vibration occurrence pixel 47 is densely arranged in the predetermined number or more in the imaging element 42 can be set. For example, it may also be that the defective region 91 is set by performing an image analysis on a distribution image of the vibration occurrence pixels 47 in the semiconductor device 13 that is a good product and a distribution image of the vibration occurrence pixels 47 in the semiconductor device 13 that is an inspection target.

After the setting of the defective region 91 ends, the CPU 56 of the detection unit 55 proceeds to Step S109 of FIG. 9, and determines whether the defective region 91 has been set. In the case of determining YES in Step S109 of FIG. 9, the CPU 56 of the detection unit 55 outputs a defect detection signal to the outside in Step S100 of FIG. 9. At this time, information such as the position, shape of the defective region 91 may also be output together to the outside.

Also, in the case of determining NO in Step S109 of FIG. 9, the CPU 56 of the detection unit 55 determines that no defect has been detected, and outputs a good product detection signal indicating that the semiconductor device 13 as the inspection target is a good product in Step S11 of FIG. 9.

<3. Display Step>

In Step S112 of FIG. 9, the CPU 56 of the detection unit 55, as shown in FIG. 8, displays the visualized image 12e on the display 58 (display step), in which the expression 18 corresponding to the vibration occurrence pixel 47 that is specified is included in the image of the semiconductor die 12.

Although the visualized image 12e can be presented in various forms, FIG. 8, as an example, illustrates an image in which portions corresponding to the vibration occurrence pixels 47 are superimposed with red dots as the expressions 18 in the image of a general semiconductor die 12 obtained by irradiating the semiconductor die 12 with non-interfering light such as a lamp. According to the image, in a region in the vicinity of the defective part 14 that vibrates through ultrasonic vibration, a large number of red dots that are the expressions 18 are displayed, whereas there is hardly any red dot that is the expression 18 in portions which do not vibrate and which is other than the defective part 14. In the example shown in FIG. 8, in the central portion of the semiconductor die 12 where a large number of red dots that are the expressions 18 are displayed, it is known that the gap 90 forming the defective part 14 that ultrasonically vibrates due to application of ultrasonic vibration is present, and the gap 90 is not present elsewhere. Accordingly, by visually confirming the visualized image 12e displayed on the display 58, whether the gap 90 that is a defect is present in the semiconductor device 13 can be detected. It is noted that the red dots representing the expressions 18 are shown as black dots in FIG. 8.

In addition, the CPU 56 of the detection unit 55 may also superimpose and display the defective region 91 set in Step S108 of FIG. 9 on the visualized image 12e. Accordingly, the defective region 91 and the expression 18 are superimposed and displayed on the image of the general semiconductor die 12, and whether a defect is detected can be checked visually.

<Function/Effect of Defect Detection Device 100>

As described above, the defect detection device 100 of the embodiment irradiates the semiconductor device 13 with the collimated laser light 32 and ultrasonically vibrates the semiconductor device 13, and performs defect detection based on the deviation between the images 12a, 14a including the interference pattern at the time of being static and the images 12a, 14b including the interference pattern at the time of ultrasonic vibration. Therefore, the defect detection device 100 can detect the defect of the semiconductor device 13 within a short time by using a simple configuration.

In addition, in the case where the predetermined number of other vibration occurrence pixels 47(x1, y1) are present within the predetermined range around one vibration occurrence pixel 47(x, y), the defect detection device 100 determines that the change of the brightness intensity of the pixel 46(x, y) is due to ultrasonic vibration and maintains the specification of the pixel 46(x, y) as the vibration occurrence pixel 47(x, y). In the case where the predetermined number of other vibration occurrence pixels 47(x1, y1) are not present within the predetermined range around one vibration occurrence pixel 47(*x, y*), the defect detection device 100 cancels the specification as the vibration occurrence pixel 47(*x, y*). Accordingly, the specification of the pixel 46 actually not vibrating as the vibration occurrence pixel 47 due to noise is suppressed, and vibration detection as well as defect detection can be performed more accurately.

In addition, since the defect detection device 100 sets the region in which the vibration occurrence pixel 47 that is specified is densely arranged in the predetermined number of more as the defective region 91, defect detection can be carried out based on the deviation between the images 12*a*, 14*a* including the interference pattern at the time of being static and the images 12*a*, 14*b* including the interference pattern at the time of ultrasonic vibration.

In addition, since the defect detection device 100 displays the visualized image 12*e* visualizing the defective part 14 on the display 58, whether a defect is present or not can be simply determined by visually checking the display 58.

In addition, in the defect detection device 100 of the embodiment, the ultrasonic waves 24 are concentrated on the semiconductor device 13 by using the acoustic head 20 to which the ultrasonic speakers 21 are installed to indirectly ultrasonically vibrate the semiconductor device 13 and perform defect detection. Therefore, defect detection can be performed by using a simple configuration. In addition, since the semiconductor device 13 is ultrasonically vibrated indirectly, the defect of the semiconductor device 13 can be detected in a non-contact manner.

<Modified Examples of Defect Detection Device 100>

In the above description, the laser light source 30 is described as irradiating the semiconductor device 13 with the collimated laser light 32 of a single wavelength. However, the invention is not limited thereto. The wavelength may have a slight width, or the laser light that is not collimated light may be irradiated. In addition, the laser light may have some variation in intensity. Moreover, in the above description, the images 12*a*, 14*a*, 14*b* of the interference pattern are described as a spotted pattern including multiple bright parts 16 and dark parts 17. However, the invention is not limited thereto, and the images may also exhibit other patterns, such as a striped pattern.

Moreover, in the case where the vibration direction of the semiconductor device 13 is not a single direction, it may also be that multiple laser light sources 30 and cameras 40 are prepared, the semiconductor device 13 is irradiated with laser light from multiple directions, and images are captured from multiple directions by using the cameras 40, thereby detecting vibrations in multiple directions and performing defect detection.

Moreover, in the above description, the semiconductor device 13 is described as the detection target. However, the defect detection device is also applicable in detecting a bonding defect between layers of other products in which plate-shaped members are laminated and bonded. Examples of such other products in which plate-shaped members are laminated and bonded include laminate plates, laminate materials, etc.

Other Embodiment 1

In the following, a defect detection device 200 of another embodiment is described with reference to FIG. 11. The parts same as the parts having been described above with reference to FIGS. 1 to 10 are labeled with the same reference symbols, and the descriptions thereof are omitted.

Figure 11:
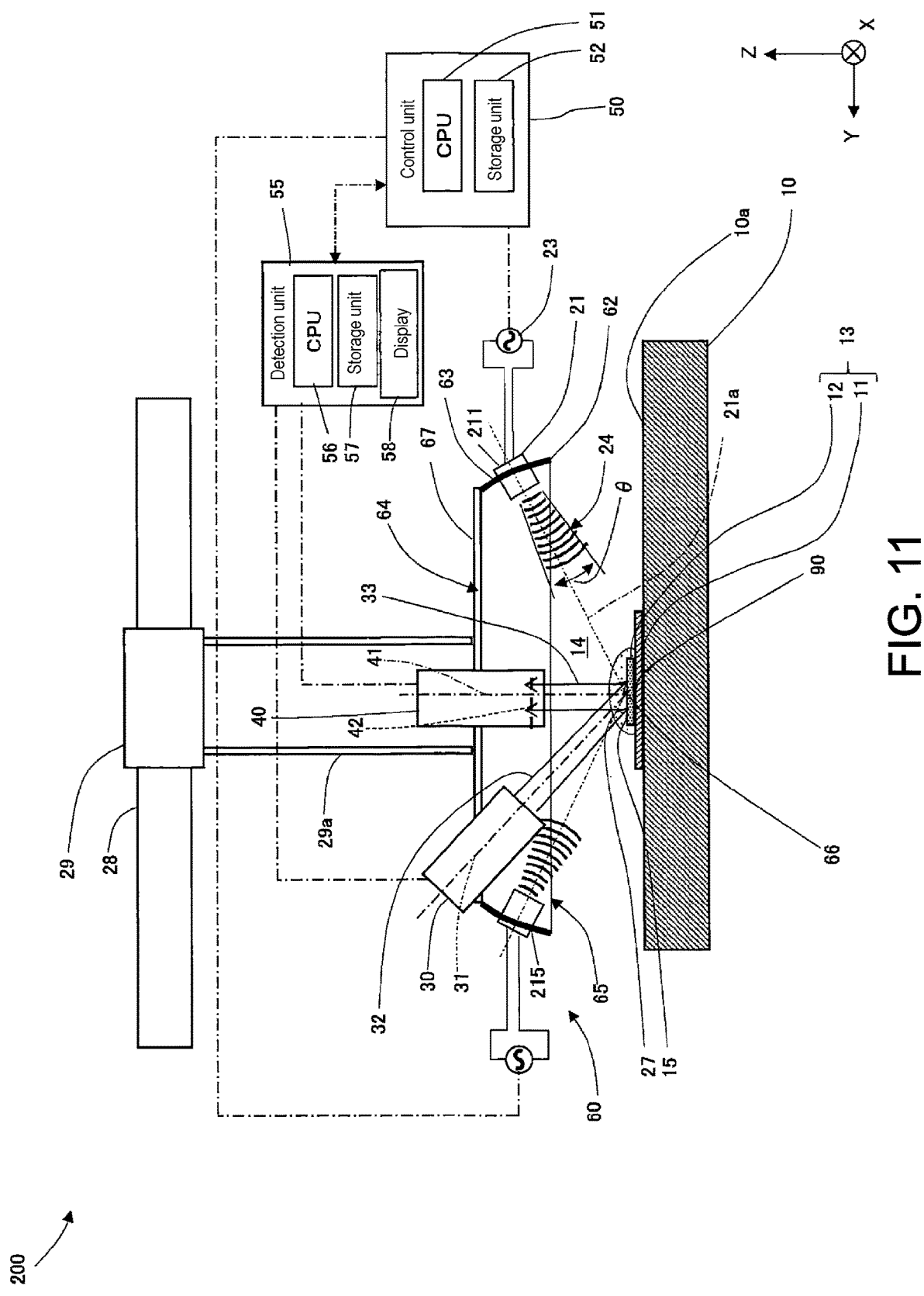
FIG. 11 is an elevation view illustrating a configuration of a defect detection device according to another embodiment.
Figure 12:
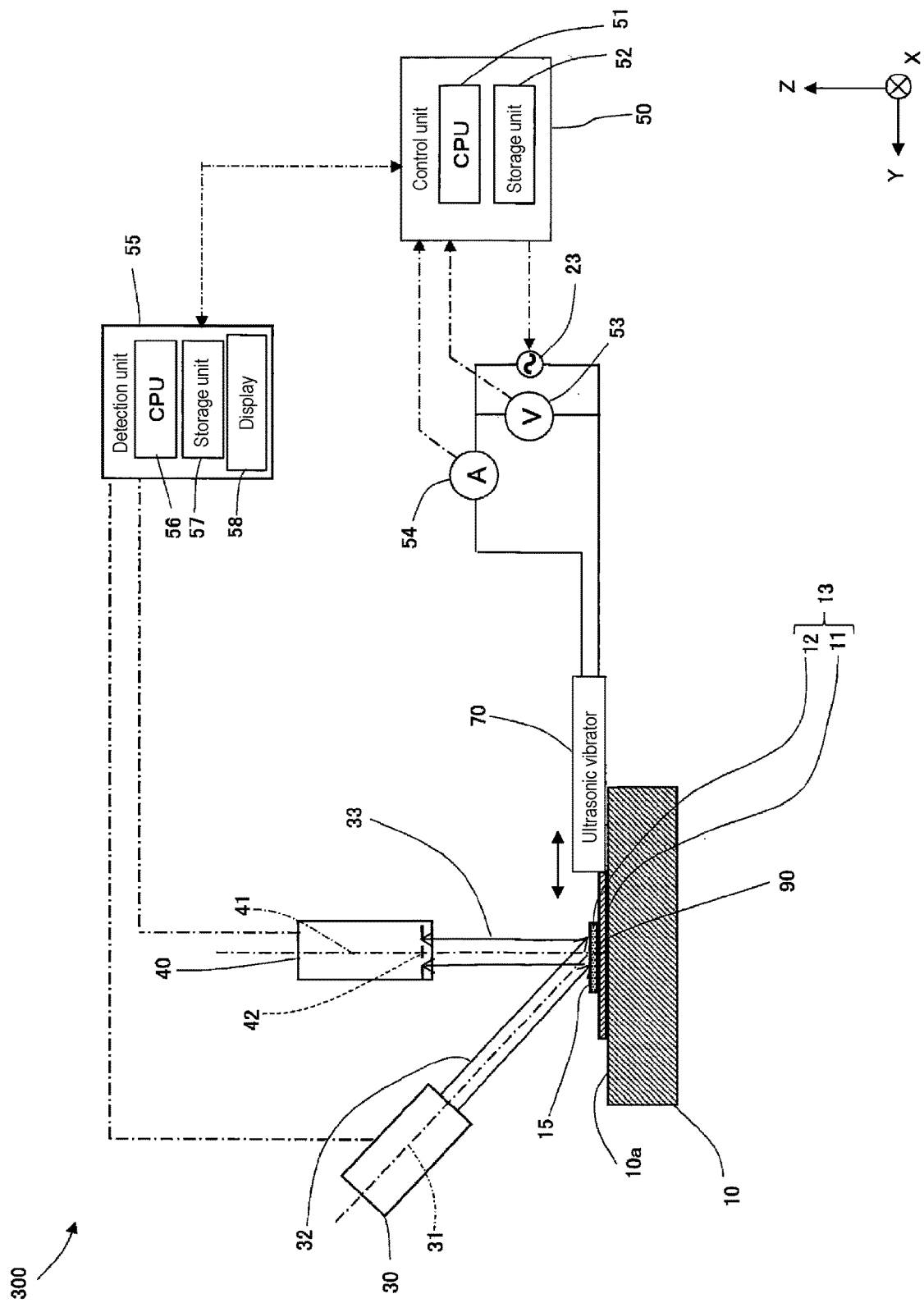
FIG. 12 is a system diagram illustrating a configuration the defect detection device of another embodiment which ultrasonically vibrates a semiconductor device by using an ultrasonic vibrator.

As shown in FIG. 11, in the defect detection device 200 of the embodiment, the acoustic head 20 of the defect detection device 100 described with reference to FIG. 1 is configured by using an acoustic head 60 in which the ultrasonic speakers 21 are installed to an annular casing 62.

As shown in FIG. 11, the casing 62 is an annular member in a spherical stage shape with an open surface 64 having a small diameter on the upper side and an open surface 65 having a large diameter on the lower side. The ultrasonic speakers 21 are installed to a spherical band surface 63. A spherical center 66 of the spherical band surface 63 is located on the surface 15 of the semiconductor device 13 held on the holding surface 10*a* of the stage 10. The ultrasonic speakers 21 are installed to the casing 62, so that the respective axes 21*a* intersect with each other at the spherical center 66 of the spherical surface of the casing 62. Like the defect detection device 100 described with reference to FIG. 1, the ultrasonic waves 24 generated from the respective ultrasonic speakers 21 intersect with each other and are concentrated and superimposed at the spherical center 66. By superimposing the ultrasonic waves 24, the detection region 27 in which the amplitude of ultrasonic vibration is large is formed in the vicinity of the spherical center 66.

The operation of the defect detection device 200 is the same as the defect detection 100 described with reference to FIG. 1.

In the defect detection device 200, since the casing 62 is formed with an annular member in a spherical stage shape and a top plate 67, the thickness in Z-direction can be reduced, and the defect detection device 200 can be installed to a small-sized bonding apparatus, etc.

Other Embodiment 2

In the following, a defect detection device 300 of another embodiment is described with reference to FIGS. 12 to 17. In the defect detection device 300, in place of the acoustic head 20 of the defect detection device 100 described with reference to FIG. 1, an ultrasonic vibrator 70 connected with the semiconductor device 13 is used to ultrasonically vibrate the semiconductor device 13. The ultrasonic vibrator 70 forms an ultrasonic vibration device. The configuration of the laser light source 30, the camera 40, and the detection unit 55 is the same as the configuration of the defect detection device 100 described above.

The ultrasonic vibrator 70 is driven by the driving unit that supplies high frequency power to the ultrasonic vibrator 70. The ultrasonic vibrator 70, for example, may be formed by a piezo element, etc. A voltage sensor 53 that detects the voltage of the high frequency power supplied from the driving unit 23 to the ultrasonic vibrator 70 and a current sensor 54 that detects the current of the high frequency power supplied from the driving unit 23 to the ultrasonic vibrator 70 are installed between the driving unit 23 and the ultrasonic vibrator 70. The voltage sensor 53 and the current sensor 54 are connected to the control unit 50, and the data of the voltage and the current of the high frequency power detected by the voltage sensor 53 and the current sensor 54 are input to the control unit 50. The control unit 50 captures the image of the semiconductor device 13 by using the camera 40 while changing the frequency of the high frequency power supplied from the driving unit 23 to the ultrasonic vibrator 70, and detects the defect of the semiconductor device 13 based on the captured image.

Before describing the operation of the defect detection device 300 of the embodiment, the change of an impedance and a current A0 with respect to the frequency f in the case where the voltage V0 of the high frequency power supplied from the driving unit 23 to the ultrasonic vibrator 70 is constant, as in the conventional technique, is described with reference to FIG. 13.

Figure 13:
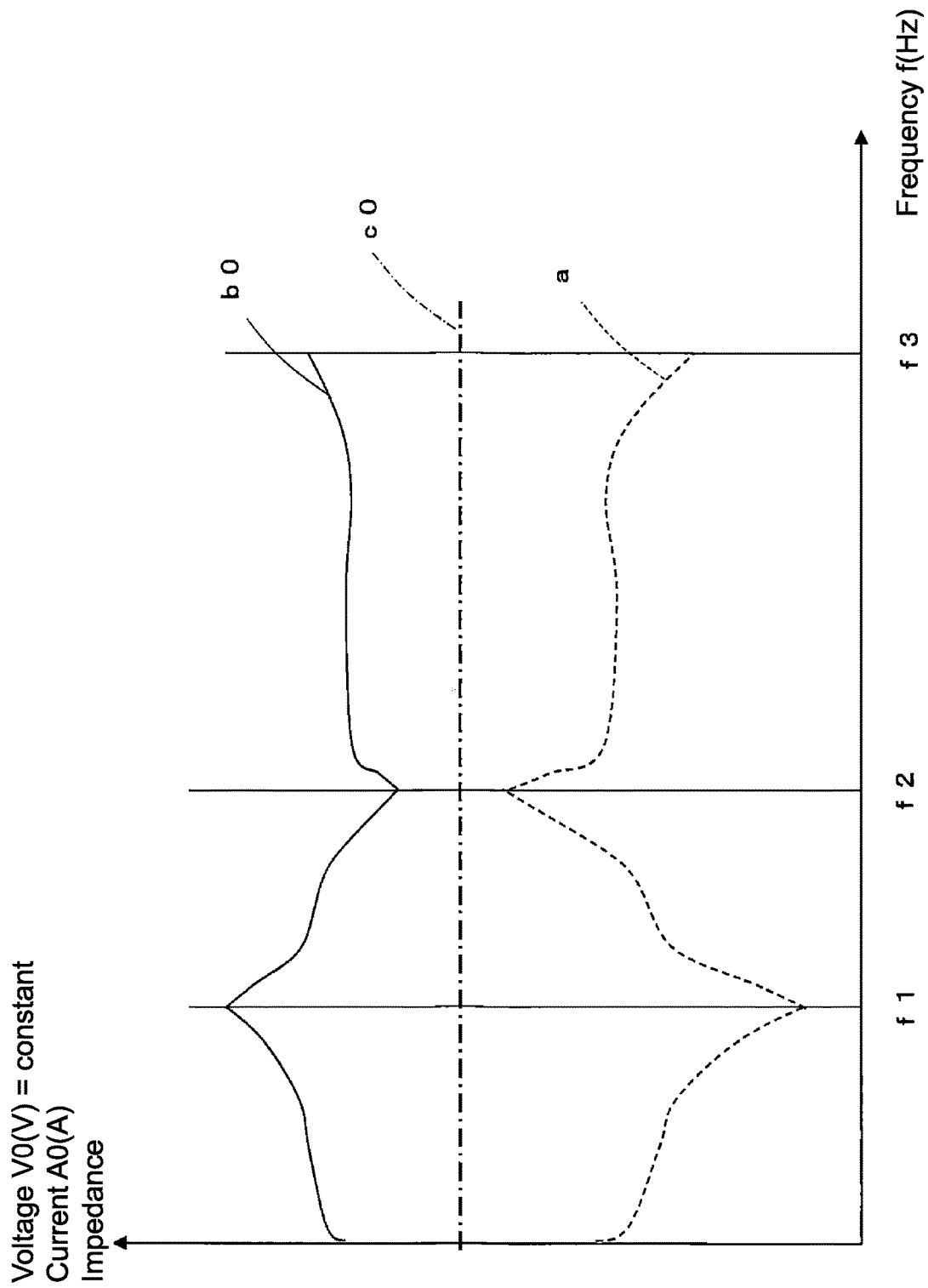
FIG. 13 is a diagram illustrating a change of an impedance of an ultrasonic vibrator and a change of a current of high frequency power with respect to a frequency of the high frequency power in a case where a voltage of the high frequency power supplied to the ultrasonic vibrator is constant in the conventional art.

As shown in a dot-chain line c0 shown in FIG. 13, when the voltage of the high frequency power supplied from the driving unit 23 to the ultrasonic vibrator 70 is set to be constant, and the frequency f of the high frequency power is changed, the ultrasonic vibrator 70 itself resonates at a frequency f1. Accordingly, as indicated by a broken line a in FIG. 13, the impedance of the ultrasonic vibrator 70 drops significantly at the frequency f1. Meanwhile, at a frequency f2 between the resonance frequency f1 and a maximum frequency f3, the impedance of the ultrasonic vibrator 70 rises significantly.

When the impedance of the ultrasonic vibrator 70 drops significantly in the vicinity of the frequency f1 as indicated by the broken line a of FIG. 13, as indicated by a solid line b0 in FIG. 13, the current A0 of the high frequency power supplied to the ultrasonic vibrator 70 rises significantly. Comparatively, when the impedance of the ultrasonic vibrator 70 rises significantly in the vicinity of the frequency f2, the current A0 of the high frequency power supplied to the ultrasonic vibrator 70 drops significantly. The intensity of the current A0 supplied to the ultrasonic vibrator 70 is proportional to the amplitude of the ultrasonic vibrator 70. Accordingly, in the vicinity of the frequency f1 at which the ultrasonic vibrator 70 resonates, the amplitude of the ultrasonic vibrator 70 rises significantly and the amplitude of the substrate 11 increases significantly, and in the vicinity of the frequency f2, the amplitude of the ultrasonic vibrator 70 drops significantly and the amplitude of the substrate 11 decreases significantly.

Therefore, since both the substrate 11 and the semiconductor die 12 vibrate significantly at the frequency f1 at which the ultrasonic vibrator 70 resonates, the vibration of the defective part 14 of the semiconductor die 12 may be hidden in the vibration of the substrate 11 and the semiconductor die 12, making it difficult to detect the vibration of the defective part 14.

Comparatively, at the frequency f2, the vibration of the substrate 11 and the semiconductor die 12 is very small, and the vibration of the defective part 14 of the semiconductor die 12 may not be detectable.

As described above, in the case where the voltage V0 supplied to from the driving unit 23 to the ultrasonic vibrator 70 is constant and the frequency is changed as in the conventional technique, it may be difficult to detect the defective part 14 of the semiconductor die 12 at the frequency f1 at which the ultrasonic vibrator 70 resonates.

Therefore, the defect detection device 300 of the embodiment focuses on that the amplitude of the ultrasonic vibrator 70 is proportional to the current of the high frequency power input to the ultrasonic vibrator 70, detects a current A1 of the high frequency power input to the ultrasonic vibrator 70, and adjusts a voltage V1 of the high frequency power so that the detected current A1 falls within a predetermined range. Accordingly, the current A1 of the high frequency power can be set to fall within a predetermined range to set the amplitude of the ultrasonic vibrator 70 within a predetermined range. In addition, when the frequency of the high frequency power is changed and the semiconductor device 13 is ultrasonically vibrated, the substrate 11 and the semiconductor die 12 is suppressed from vibrating significantly at a specific frequency and that the vibration of the defective part 14 is suppressed from being hidden in the vibration of the substrate 11 and the semiconductor die 12 and not detectable.

In the following, with reference to FIG. 14, an operation of changing the voltage V1 and the current A1 of the high frequency power in the case where the voltage V1 of the high frequency power supplied to the ultrasonic vibrator 70 is changed so that the current A1 detected by the current sensor 54 is constant in the defect detection device 300 of the embodiment is described.

Figure 14:
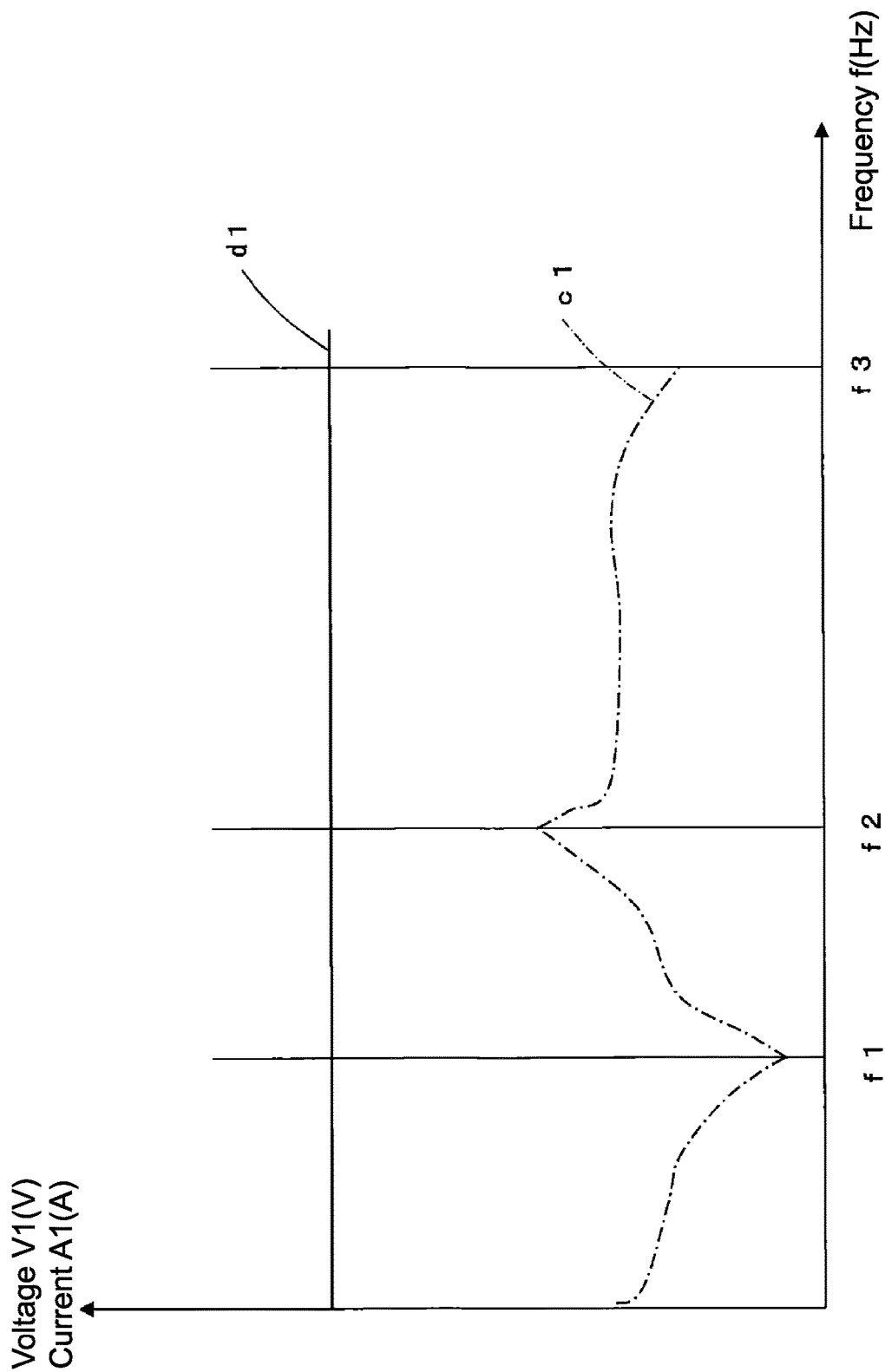
FIG. 14 is a diagram illustrating changes of a voltage and a current of the high frequency power in a case where the voltage of the high frequency power supplied to the ultrasonic vibrator is changed, so that a current detected by a current sensor is constant in the defect detection device according to the embodiment shown in FIG. 12.

In the defect detection device 300 of the embodiment, the current A1 detected by the current sensor 54 is fed back to the control unit 50, and in the vicinity of the frequency f1 at which the current A1 of the high frequency power increases, the voltage V1 of the high frequency power supplied to the ultrasonic vibrator 70 is lowered, as indicated by a dot-chain line c1 of FIG. 14. Meanwhile, in the vicinity of the frequency f2 at which the current A1 detected by the current sensor 54 decreases, the voltage V1 of the high frequency power supplied to the ultrasonic vibrator 70 is raised, as indicated by the dot-chain line e1 of FIG. 14. Accordingly, as indicated by a solid line d1 in FIG. 14, the intensity of the current A1 detected by the current sensor 54 can be substantially constant regardless of the frequency f.

In this way, through the feedback control so that the current A1 of the high frequency power supplied from the driving unit 23 to the ultrasonic vibrator 70 is substantially constant, even if the frequency f of the high frequency power is changed, the amplitude of the ultrasonic vibrator 70 is substantially constant, and the vibration of the substrate 11 and the semiconductor die 12 can be substantially constant. Accordingly, when the frequency of the high frequency power is changed and the semiconductor device 13 is ultrasonically vibrated, that the substrate 11 or the semiconductor die 12 vibrate significantly at a specific frequency and the vibration of the defective part 14 is hidden in the vibration of the substrate 11 and the semiconductor die 12 and not detectable can be suppressed.

Then, the defect detection on the semiconductor device 13 by using the defect detection device 300 according to the embodiment is described with reference to FIG. 15. Regarding the steps of operations same as the operations of the defect detection device 100 described with reference to FIG. 9, the steps are labeled with the same reference symbols, and the description is omitted.

Figure 15:
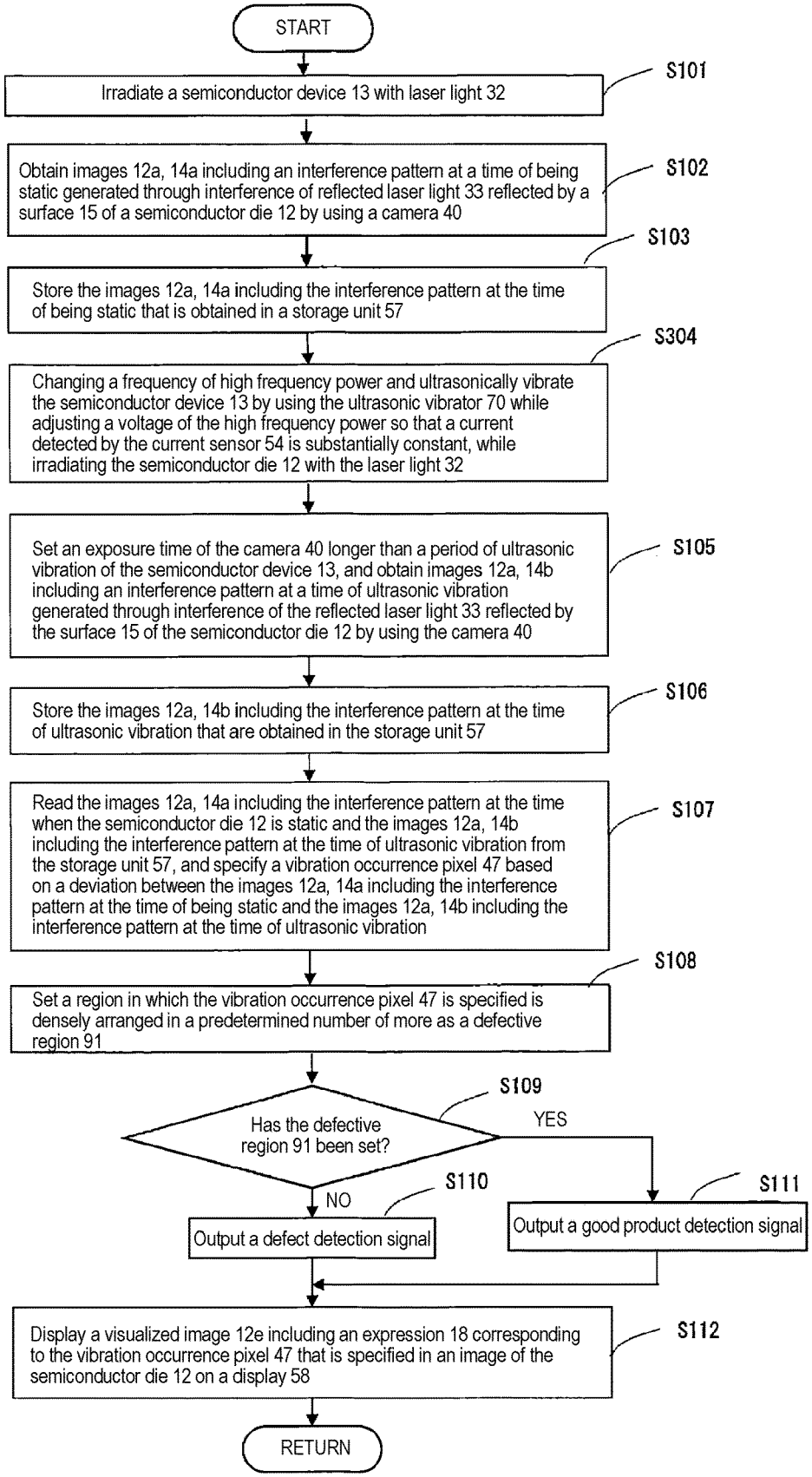
FIG. 15 is a flowchart illustrating an operation of the defect detection device shown in FIG. 12.

As shown in Step S101 to Step S103 of FIG. 15, the detection unit 55 irradiates the semiconductor device 13 with the collimated laser light 32 to obtain the images 12a, 14a of the interference pattern at the time of being static and stores the images 12a, 14a in the storage unit 57.

The detection unit 55 outputs the signal for starting driving the ultrasonic vibrator 70 to the control unit 50 after storing the images 12a, 14a of the interference pattern at the time of being static in the storage unit 57. When the signal is input, the CPU 51 of the control unit 50 outputs a command for starting driving the ultrasonic vibrator 70 to the driving unit 23, as shown in Step S304 of FIG. 15. In accordance with the command, the driving unit 23 drives the ultrasonic vibrator 70 to ultrasonically vibrate the semiconductor device 13.

As indicated in Step 304 of FIG. 15, the CPU 51 of the control unit 50 ultrasonically vibrates the semiconductor device 13 by using the ultrasonic vibrator 70 while changing the frequency f from the starting frequency f0 of the high frequency power to the maximum frequency f3 (f0<f3), while adjusting the voltage V1 of the high frequency power so that the current A1 detected by the current sensor 54 is substantially constant.

After the ultrasonic vibration on the semiconductor device 13 by using the ultrasonic vibrator 70 starts, the CPU 51 of the control unit 50 outputs the signal that ultrasonic vibration is being carried out and the starting frequency f0 of ultrasonic vibration to the detection unit 55. When the signal is input, at Step S105 of FIG. 15, the CPU 56 of the detection unit 55 sets the exposure time of the camera 40 to be longer than the period of ultrasonic vibration at the time of the starting frequency f0, obtains the images 12*a*, 14*b* including the interference pattern at the time of ultrasonic vibration by using the camera 40 as described with reference to FIG. 6, and stores the images 14*a*, 14*b* in the storage unit 57 at Step S106 of FIG. 15. The camera 40 may capture the images 12*a*, 14*a*, 14*b* as motion images and store motion image data in the storage unit 57, and may also capture the images 12*a*, 14*a*, 14*b* as static images every time when the frequency f of ultrasonic vibration changes by a predetermined frequency Δf and store a data set of multiple static images in the storage unit 57.

The CPU 56 of the detection unit 55, like the defect detection device 100 described above, specifies the vibration occurrence pixel 47 at Step S107 of FIG. 15, and sets, as the defective region 91, a region in which the vibration occurrence pixel 47 is densely arranged in the predetermined number of more at Step S108 of FIG. 15. Then, in the case of YES in Step S109 of FIG. 15, the defect detection signal is output at Step S110 of FIG. 15, and in the case of NO in Step S109 of FIG. 15, the good product detection signal is output at Step S111 of FIG. 15. Then, the visualized image 12*e* is displayed on the display 58 at Step S112 of FIG. 15.

As described above, when the frequency of the high frequency power is changed to ultrasonically vibrate the semiconductor device 13, the defect detection device 300 of the embodiment sets the amplitude of the ultrasonic vibrator 70 within the predetermined range, and can suppress the substrate 11 and the semiconductor die 12 from vibrating significantly at a specific frequency. Accordingly, that the vibration of the defective part 14 is hidden in the vibration of the substrate 11 and the semiconductor die 12 and not detectable at a specific frequency is suppressed, and the detection accuracy of the defective part 14 can be facilitated.

In addition, like the defect detection device 100, the defect detection device 300 ultrasonically vibrates the semiconductor device 13, and performs defect detection based on the deviation between the images 12*a*, 14*a* including the interference pattern at the time of being static and the images 12*a*, 14*b* including the interference pattern at the time of ultrasonic vibration. Therefore, the defect detection device 300 can detect the defect of the semiconductor device 13 within a short time by using a simple configuration.

In the above description, through the feedback control so that the current A1 of the high frequency power supplied from the driving unit 23 to the ultrasonic vibrator 70 is substantially constant, the amplitude of the ultrasonic vibrator 70 is substantially constant in the case where the frequency f of the high frequency power is changed. However, the invention is not limited thereto.

Figure 16:
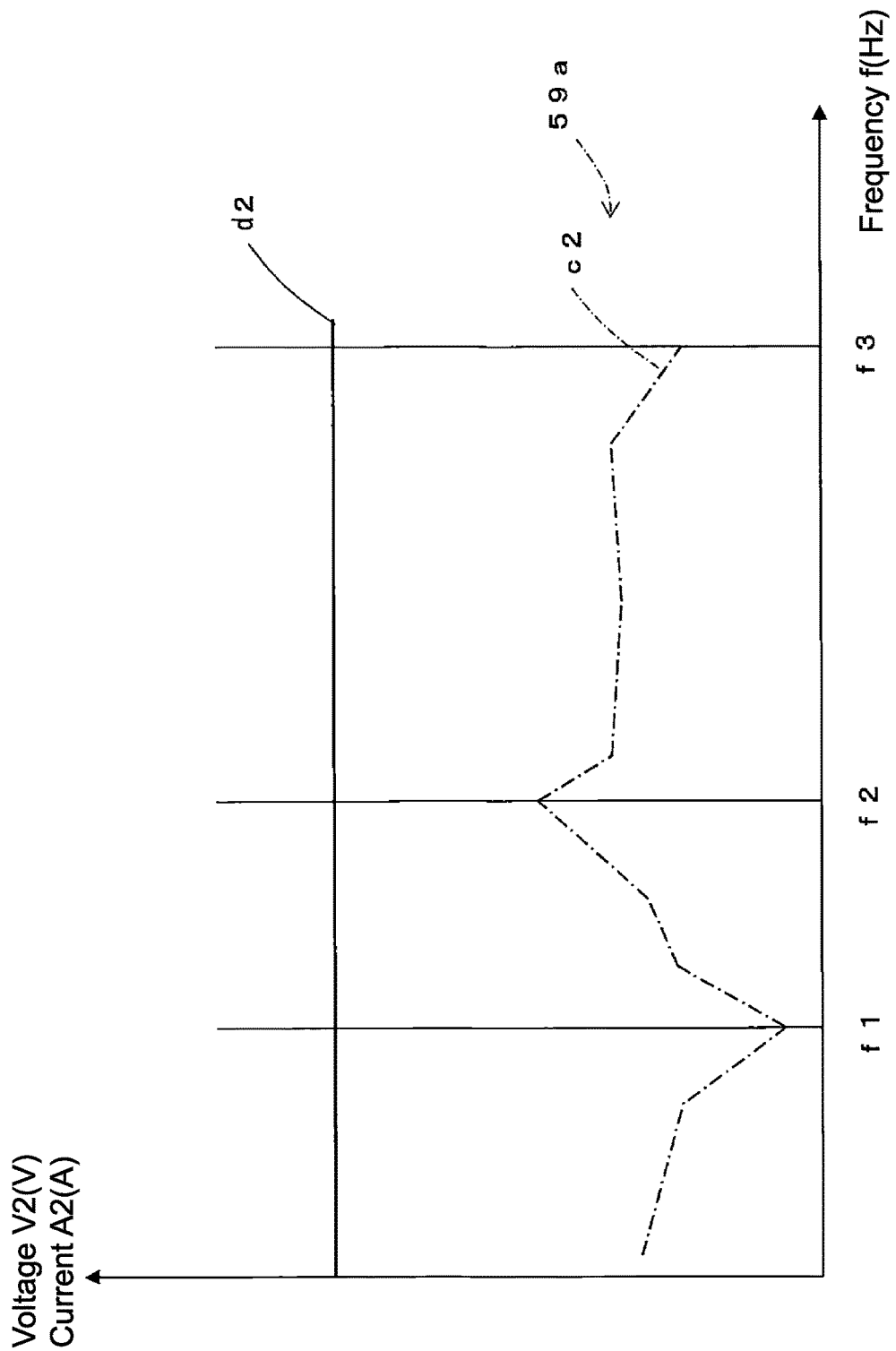
FIG. 16 is a diagram illustrating a diagram of a map in which the change of the voltage of the high frequency power with respect to the frequency of the high frequency power is defined in advance, so that the current of the high frequency power supplied to the ultrasonic vibrator is constant in the defect detection device according to the embodiment shown in FIG. 12.
Figure 17:
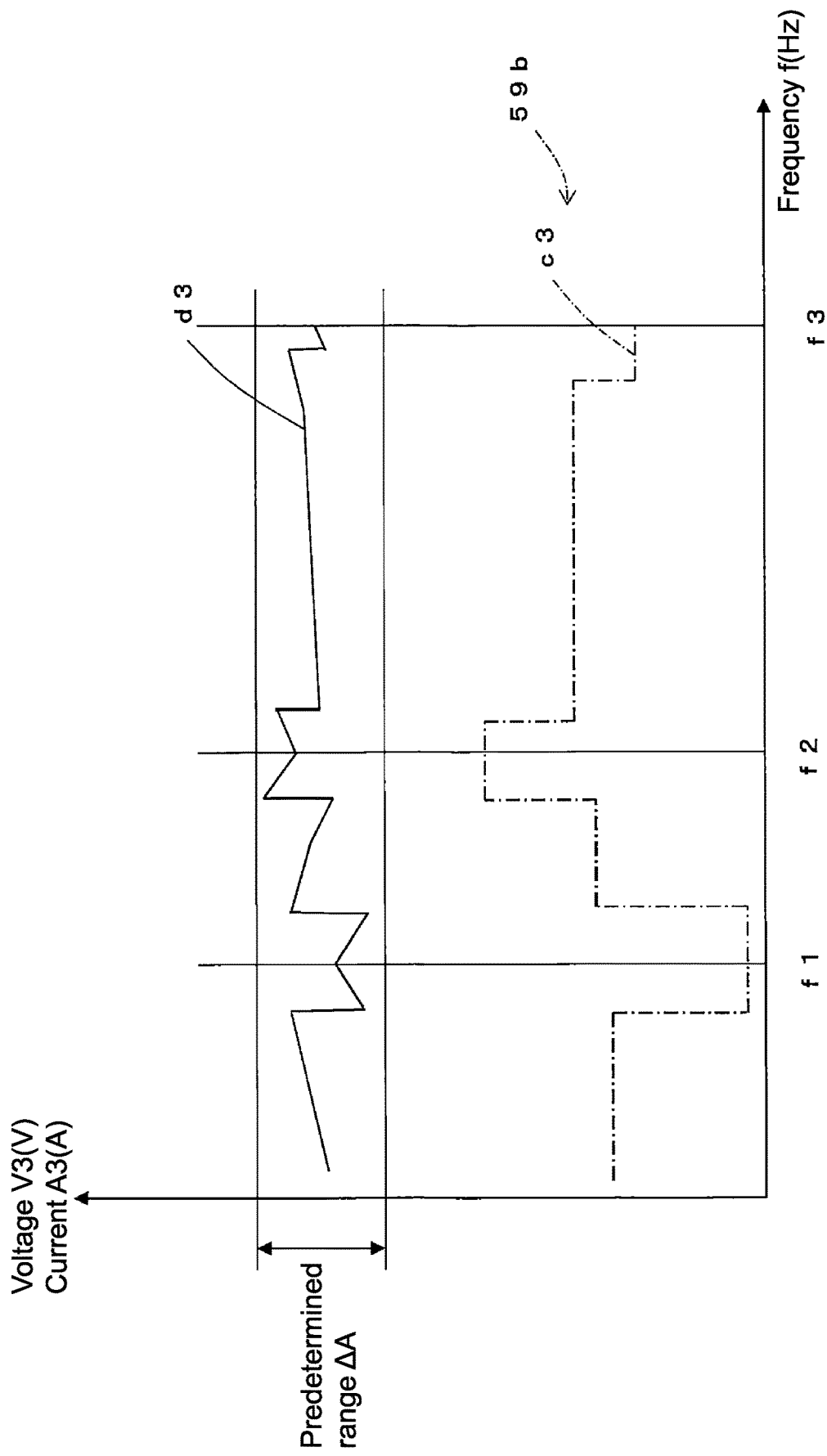
FIG. 17 is a diagram illustrating a diagram of another map in which the change of the voltage of the high frequency power with respect to the frequency of the high frequency power is defined in advance, so that the current of the high frequency power supplied to the ultrasonic vibrator is within a predetermined range in the defect detection device according to the embodiment shown in FIG. 12.

For example, as described with reference to FIG. 13, the change of the current A0 of the high frequency power when voltage V0 of the high frequency power is constant and the frequency is changed is obtained in advance through testing, etc., a voltage waveform opposite to the increase and decrease of the current A0 as indicated by a dot-chain line c2 in FIG. 16 is generated in advance, and the voltage waveform is stored in advance in the storage unit 52 as a map 59*a* indicating the change of a voltage V2 with respect to the frequency f. As shown in the dot-chain line c2 in FIG. 16, the map 59*a* forms a waveform in which the voltage decreases in the vicinity of the frequency f1 and increases at the frequency f2. In addition, at the time of performing ultrasonic vibration, the voltage with respect to the frequency f may be adjusted by referring to the map 59*a* stored in the storage unit 52. In such case, as indicated by a solid line d2 of FIG. 16, even if the frequency changes, the current A2 supplied to the ultrasonic vibrator 70 is substantially constant.

Accordingly, by using a simple configuration, when the semiconductor device 13 is ultrasonically vibrated at various frequency bands, that the entirety of the semiconductor device 13 is significantly vibrated, and the vibration of the defective part 14 is hidden in the vibration of the substrate 11 and the semiconductor die 12 and not detectable can be suppressed, and the defect of the semiconductor device 13 can be accurately detected.

In addition, the testing may be simplified. For example, as indicated by a dot-chain line c3 in FIG. 17, a voltage waveform in which a voltage V3 changes with respect to the frequency f in a stepped manner may be set as a map 59*b* and stored in the storage unit 52. In such case, as indicated by a solid line d3 of FIG. 17, although a current A3 supplied to the ultrasonic vibrator 70 is not substantially constant, the current A3 still falls within a predetermined range ΔA. Accordingly, the defect of the semiconductor device 13 can be accurately detected within a short time by using a simpler method.

Other Embodiment 3

Figure 18:
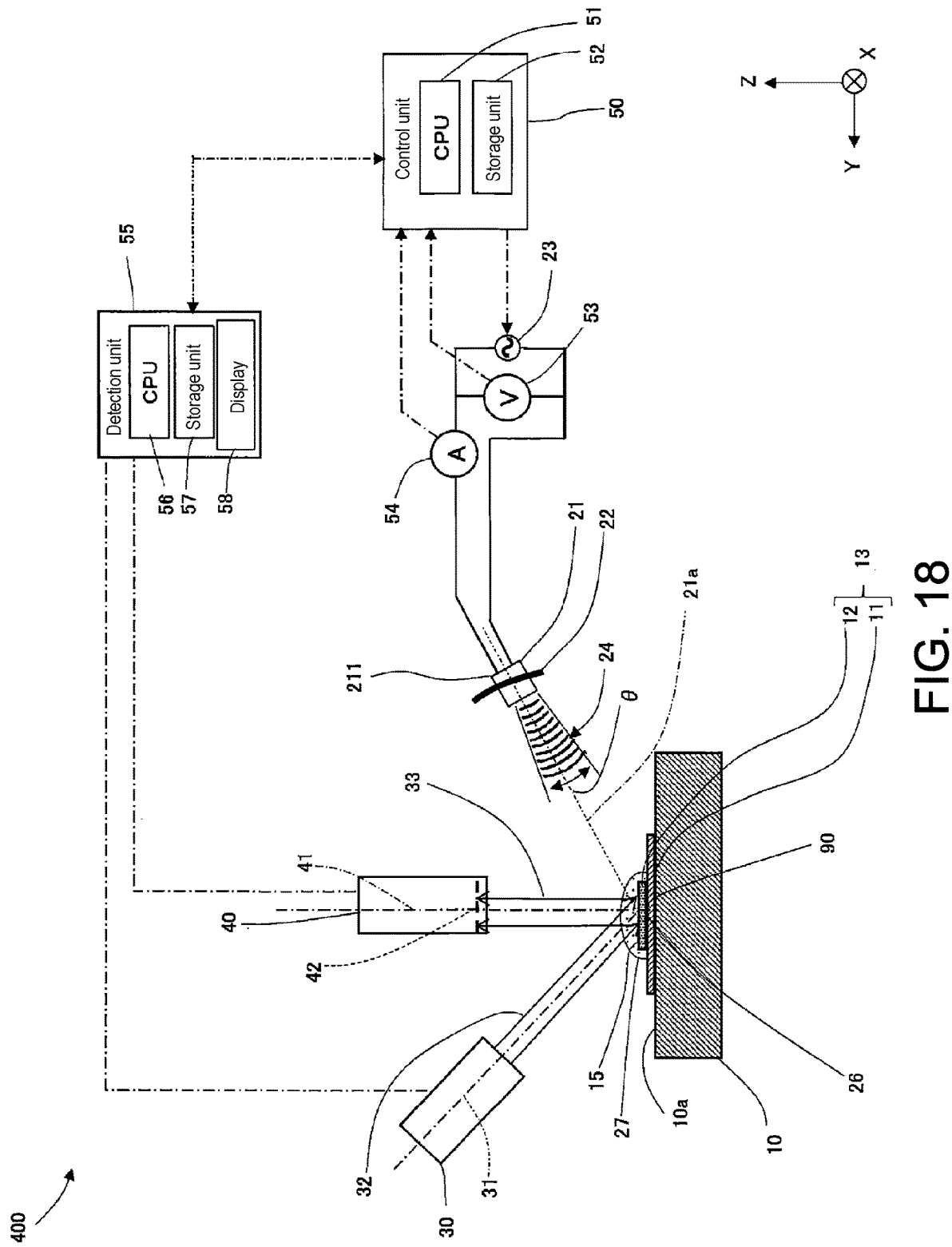
FIG. 18 is a view illustrating a configuration of a defect detection device according to another embodiment.

In the following, a defect detection device 400 of another embodiment is described with reference to FIG. 18. In the defect detection device 400, like the defect detection device 300 described with reference to FIGS. 12 to 17, the voltage sensor 53 and the current sensor 54 are respectively installed between each of the driving units 23 and each of the ultrasonic speakers 21 (ultrasonic speakers 212 to 215) of the defect detection device 100 described with reference to FIG. 1. In addition, in FIG. 18, only one ultrasonic speaker 211 installed to the acoustic head 20 is shown, and the rest of the ultrasonic speakers 212 to 215 are omitted from the figure. In addition, only a portion of the casing 22 in the vicinity of the ultrasonic speaker 211 is shown, and the rest portions are omitted from the figure.

Except that, in place of the driving unit 23 driving the ultrasonic vibrator 70, the driving units 23 respectively drive the ultrasonic speakers 21, the operation of the defect detection device 400 is the same as the operation of the defect detection device 300.

In the defect detection device 400, through the feedback control so that the current A1 of the high frequency power supplied from each of the driving units 23 to each of the ultrasonic speakers 21 is substantially constant, even if the frequency f of the high frequency power is changed, the ultrasonic vibration force applied by each of the ultrasonic speakers 21 to the semiconductor device 13 is substantially constant, and the vibration of the substrate 11 and the semiconductor die 12 can be substantially constant. Accordingly, like the defect detection device 300, when the frequency of the high frequency power is changed and the semiconductor device 13 is ultrasonically vibrated, the substrate 11 and the semiconductor die 12 vibrate significantly at a specific frequency, and that the vibration of the defective part 14 is hidden in the vibration of the substrate 11 and the semiconductor die 12 and not detectable can be suppressed.

In addition, like the defect detection device 100, the defect detection device 400 ultrasonically vibrates the semiconductor device 13, and performs defect detection based on the deviation between the images 12*a*, 14*a* including the interference pattern at the time of being static and the images 12*a*, 14*b* including the interference pattern at the time of ultrasonic vibration. Therefore, the defect detection device 300 can detect the defect of the semiconductor device 13 within a short time by using a simple configuration. In addition, since the semiconductor device 13 is ultrasonically vibrated indirectly, the defect of the semiconductor device 13 can be detected in a non-contact manner.

<Vibration Detection Device>

Although the defect detection devices, 100, 200, 300, 400 are all described to set the defective region 91 and detect the defect of the semiconductor device 13 that is an inspection target, Steps S108 to S111 of FIG. 9 or Steps S108 to S11 of FIG. 15 may be omitted, and the devices 100, 200, 300, 400 may function as a vibration detection device which displays the vibration occurrence pixel indicating a vibration occurrence location on the display 58 to specify a vibration location of the semiconductor device 13 as the inspection target.

In the case where the defect detection device 100 functions as a vibration detection device, the detection unit 55 processes the image captured by the camera 40 to specify the vibration occurrence pixel 47 indicating the vibration occurrence location, and displays the visualized image 12*e* including an expression corresponding to the vibration occurrence pixel 47 that is specified on the display 58.

In the case where the defect detection device 100 functions as a vibration detection device, the determination on whether there is a defect is performed by an inspector making a visual determination on the image of the display 58.

Such an operation is useful, for example, when the semiconductor device 13 is new and there is no threshold or predetermined value for setting the defective region 91.

What is claimed is:

1. A defect detection device, detecting a defect of an inspection target, the defect detection device comprising:
    an ultrasonic vibration device, ultrasonically vibrating the inspection target;
    a coherent light source, irradiating the inspection target with coherent light;
    a camera, having an imaging element imaging the inspection target irradiated with the coherent light to obtain an image; and
    a detection unit, detecting the defect of the inspection target based on the image imaged by the camera,
    wherein an exposure time when the camera images is longer than a period of ultrasonic vibration of the inspection target, and the camera obtains an image comprising an interference pattern generated due to interference of the coherent light reflected by a surface of the inspection target,
    the detection unit specifies a vibration occurrence pixel based on a deviation between an image comprising an interference pattern when the inspection target is static and an image comprising an interference pattern when the inspection target is ultrasonically vibrated that are obtained by the camera, and sets a region in which the vibration occurrence pixel that is specified is densely arranged in a predetermined number or more as a defective region, and detects the defect.

2. The defect detection device as claimed in claim 1, wherein, in a case where a predetermined number of other vibration occurrence pixels are present within a predetermined range around the vibration occurrence pixel that is specified, the detection unit maintains specification of the pixel as the vibration occurrence pixel, and in a case where the predetermined number of vibration occurrence pixels are not present within the predetermined range, the detection unit cancels the specification of the pixel as the vibration occurrence pixel.

3. The defect detection device as claimed in claim 1, comprising a display displaying an image of the inspection target,
    wherein the detection unit displays a visualized image in which an expression corresponding to the vibration occurrence pixel that is specified is comprised in an image of the inspection target on the display.

4. The defect detection device as claimed in claim 1, wherein the coherent light is laser light, and
    the coherent light source irradiates the inspection target with collimated laser light of a single wavelength.

5. The defect detection device as claimed claim 1, comprising:
    a driving unit, supplying high frequency power to the ultrasonic vibration device; and
    a control unit, adjusting a frequency of the high frequency power supplied from the driving unit to the ultrasonic vibration device,
    wherein when the detection unit detects the defect of the inspection target, the control unit changes the frequency of the high frequency power supplied from the driving unit to the ultrasonic vibration device.

6. The defect detection device as claimed in claim 5, comprising a current sensor, detecting a current of the high frequency power supplied from the driving unit to the ultrasonic vibration device,
    wherein when the frequency of the high frequency power supplied from the driving unit to the ultrasonic vibration device is changed, the control unit adjusts a voltage of the high frequency power supplied from the driving unit to the ultrasonic vibration device, so that the current detected by the current sensor falls within a predetermined range.

7. The defect detection device as claimed in claim 5, wherein the control unit comprises a map in which a change of a voltage of the high frequency power supplied from the driving unit to the ultrasonic vibration device with respect to the frequency of the high frequency power supplied from the driving unit to the ultrasonic vibration device is defined in advance, so that a current of the high frequency power supplied from the driving unit to the ultrasonic vibration device falls within a predetermined range, and
    when the frequency of the high frequency power supplied from the driving unit to the ultrasonic vibration device is changed, the voltage of the high frequency power supplied from the driving unit to the ultrasonic vibration device is adjusted based on the map.

8. The defect detection device as claimed in claim 1, wherein the ultrasonic vibration device is an ultrasonic speaker arranged on a periphery of the inspection target or an ultrasonic vibrator connected with the inspection target and ultrasonically vibrating the inspection target.

9. The defect detection device as claimed in claim 1, wherein the ultrasonic vibration device is formed by a plurality of ultrasonic speakers that are directive and disposed on a periphery of the inspection target, the ultrasonic speakers are installed to a casing, so as to concentrate a plurality of ultrasonic waves generated by the respective ultrasonic speakers on the inspection target.

10. The defect detection device as claimed in claim 9, comprising:
   a plurality of driving units, respectively supplying high frequency power to the ultrasonic speakers; and
   a control unit, adjusting a frequency of the high frequency power supplied from each of the driving units to each of the ultrasonic speakers,
   wherein when the detection unit detects the defect of the inspection target, the control unit changes the frequency of the high frequency power supplied from each of the driving units to each of the ultrasonic speakers.

11. The defect detection device as claimed in claim 10, comprising a current sensor, each detecting a current of the high frequency power supplied from each of the driving units to each of the ultrasonic speakers,
   wherein when the frequency of the high frequency power supplied from each of the driving units to each of the ultrasonic speakers is changed, the control unit adjusts a voltage of the high frequency power supplied from each of the driving units to each of the ultrasonic speakers, so that the current detected by each of the current sensors falls within a predetermined range.

12. The defect detection device as claimed in claim 10,
   wherein the control unit comprises a map in which a change of a voltage of the high frequency power supplied from each of the driving units to each of the ultrasonic speakers with respect to the frequency of the high frequency power supplied from each of the driving units to each of the ultrasonic speakers is defined in advance, so that a current of the high frequency power supplied from each of the driving units to each of the ultrasonic speakers each falls within a predetermined range, and
   when the frequency of the high frequency power supplied from each of the driving units to each of the ultrasonic speakers is changed, the voltage of the high frequency power supplied from each of the driving units to each of the ultrasonic speakers is adjusted based on the map.

13. The defect detection device as claimed in claim 10,
   wherein the control unit respectively adjusts each phase of each of the ultrasonic waves generated by each of the ultrasonic speakers by using each of the driving units.

14. A defect detection method for detecting a defect of an inspection target, the defect detection method comprising:
   a static image obtaining step, irradiating the inspection target with coherent light, imaging the inspection target by using a camera, and obtaining an image when the inspection target is static;
   an ultrasonically vibrated image obtaining step, ultrasonically vibrating the inspection target by using an ultrasonic vibration device while irradiating the inspection target with the coherent light, imaging the inspection target by using the camera, and obtaining an image when the inspection target is ultrasonically vibrated; and
   a defect detection step, detecting the defect of the inspection target based on a deviation between the image when the inspection target is static and the image when the inspection target is ultrasonically vibrated that are obtained by the camera,
   wherein in the static image obtaining step, an image comprising an interference pattern at a time of being static generated through interference of the coherent light reflected by a surface of the inspection target is obtained,
   in the ultrasonically vibrated image obtaining step, an exposure time of the camera is set longer than a period of ultrasonic vibration of the inspection target, and an image comprising an interference pattern at a time of ultrasonic vibration generated through interference of the coherent light reflected by the surface of the inspection target is obtained by using the camera, and
   in the defect detection step, a vibration occurrence pixel is specified based on a deviation between an image comprising an interference pattern when the inspection target is static and an image comprising an interference pattern when the inspection target is ultrasonically vibrated that are obtained by the camera, a region in which the vibration occurrence pixel that is specified is densely arranged in a predetermined number or more is set as a defective region, and the defect is detected.

15. The defect detection method as claimed in claim 14,
   wherein in the defect detection step, in a case where a predetermined number of other vibration occurrence pixels are present within a predetermined range around the vibration occurrence pixel that is specified, specification of the pixel as the vibration occurrence pixel is maintained, and in a case where the predetermined number of vibration occurrence pixels are not present within the predetermined range, the specification of the pixel as the vibration occurrence pixel is canceled.

16. The defect detection method as claimed in claim 14, further comprising:
   a display step, displaying a visualized image in which an expression corresponding to the vibration occurrence pixel that is specified is comprised in an image of the inspection target on a display.

17. A defect detection device, detecting a defect of an inspection target, the defect detection device comprising:
   an ultrasonic vibration device, ultrasonically vibrating the inspection target;
   a driving unit, supplying high frequency power to the ultrasonically vibration device;
   a current sensor, detecting a current of the high frequency power supplied from the driving unit to the ultrasonic vibration device;
   a control unit, adjusting a frequency of the high frequency power supplied from the driving unit to the ultrasonic vibration device;
   a coherent light source, irradiating the inspection target with coherent light;
   a camera, having an imaging element imaging the inspection target irradiated with the coherent light to obtain an image; and
   a detection unit, detecting the defect of the inspection target based on a deviation between an image at a time when the inspection target is static and an image at a time when the inspection target is ultrasonically vibrated that are obtained by using the camera,
   wherein when the detection unit detects the defect of the inspection target, the control unit changes the frequency of the high frequency power supplied from the driving unit to the ultrasonic vibration device, and when the frequency of the high frequency power is changed, the control unit adjusts a voltage of the high frequency power supplied from the driving unit to the ultrasonic vibration device, so that the current detected by the current sensor falls within a predetermined range.

18. A defect detection device, detecting a defect of an inspection target, the defect detection device comprising:
- an ultrasonic vibration device, ultrasonically vibrating the inspection target;
- a driving unit, supplying high frequency power to the ultrasonically vibration device;
- a control unit, adjusting a frequency of the high frequency power supplied from the driving unit to the ultrasonic vibration device;
- a coherent light source, irradiating the inspection target with coherent light;
- a camera, having an imaging element imaging the inspection target irradiated with the coherent light to obtain an image; and
- a detection unit, detecting the defect of the inspection target based on a deviation between an image at a time when the inspection target is static and an image at a time when the inspection target is ultrasonically vibrated that are obtained by using the camera,
- wherein the control unit comprises a map in which a change of a voltage of the high frequency power supplied from the driving unit to the ultrasonic vibration device with respect to the frequency of the high frequency power supplied from the driving unit to the ultrasonic vibration device is defined in advance, so that a current of the high frequency power supplied from the driving unit to the ultrasonic vibration device falls within a predetermined range, and
- when the frequency of the high frequency power supplied from the driving unit to the ultrasonic vibration device is changed, the voltage of the high frequency power supplied from the driving unit to the ultrasonic vibration device is adjusted based on the map.

19. A defect detection device, detecting a defect of an inspection target, the defect detection device comprising:
- an ultrasonic vibration device, formed by a plurality of ultrasonic speakers that are directive and disposed on a periphery of the inspection target, the ultrasonic speakers are installed to a casing, so as to concentrate a plurality of ultrasonic waves generated by the respective ultrasonic speakers on the inspection target, and ultrasonically vibrate the inspection target;
- a plurality of driving units, respectively supplying high frequency power to the ultrasonic speakers;
- a current sensor, each detecting a current of the high frequency power supplied from each of the driving units to each of the ultrasonic speakers;
- a control unit, adjusting a frequency of the high frequency power supplied from each of the driving units to each of the ultrasonic speakers,
- a coherent light source, irradiating the inspection target with coherent light;
- a camera, having an imaging element imaging the inspection target irradiated with the coherent light to obtain an image; and
- a detection unit, detecting the defect of the inspection target based on a deviation between an image at a time when the inspection target is static and an image at a time when the inspection target is ultrasonically vibrated that are imaged by using the camera,
- wherein when the detection unit detects the defect of the inspection target, the control unit changes the frequency of the high frequency power supplied from each of the driving units to each of the ultrasonic speakers, and when the frequency of the high frequency power is changed, the control unit adjusts a voltage of the high frequency power supplied from each of the driving units to each of the ultrasonic speakers, so that the current detected by each of the current sensors falls within a predetermined range.

20. A defect detection device, detecting a defect of an inspection target, the defect detection device comprising:
- an ultrasonic vibration device, formed by a plurality of ultrasonic speakers that are directive and disposed on a periphery of the inspection target, the ultrasonic speakers are installed to a casing, so as to concentrate a plurality of ultrasonic waves generated by the respective ultrasonic speakers on the inspection target, and ultrasonically vibrate the inspection target;
- a plurality of driving units, respectively supplying high frequency power to the ultrasonic speakers;
- a control unit, adjusting a frequency of the high frequency power supplied from each of the driving units to each of the ultrasonic speakers,
- a coherent light source, irradiating the inspection target with coherent light;
- a camera, having an imaging element imaging the inspection target irradiated with the coherent light to obtain an image; and
- a detection unit, detecting the defect of the inspection target based on a deviation between an image at a time when the inspection target is static and an image at a time when the inspection target is ultrasonically vibrated that are imaged by using the camera,
- wherein the control unit comprises a map in which a change of a voltage of the high frequency power supplied from each of the driving units to each of the ultrasonic speakers with respect to the frequency of the high frequency power supplied from each of the driving units to each of the ultrasonic speakers is defined in advance, so that each current of the high frequency power supplied from each of the driving units to each of the ultrasonic speakers falls within a predetermined range, and
- when the frequency of the high frequency power supplied from each of the driving units to each of the ultrasonic speakers is changed, the voltage of the high frequency power supplied from each of the driving units to each of the ultrasonic speakers is adjusted based on the map.

* * * * *